(12) United States Patent
Yamazaki

(10) Patent No.: US 6,966,735 B1
(45) Date of Patent: Nov. 22, 2005

(54) SCREW MECHANISM

(76) Inventor: Masaki Yamazaki, 2-20-9, Oimazato, Higashinari-ku, Osaka-shi, Osaka 537-0012 (JP)

(*) Notice: Subject to any disclaimer, the term of this patent is extended or adjusted under 35 U.S.C. 154(b) by 177 days.

(21) Appl. No.: 10/018,178

(22) PCT Filed: Jun. 14, 2000

(86) PCT No.: PCT/JP00/03885

§ 371 (c)(1),
(2), (4) Date: Sep. 4, 2002

(87) PCT Pub. No.: WO00/77410

PCT Pub. Date: Dec. 21, 2000

(30) Foreign Application Priority Data

| Jun. 14, 1999 | (JP) | 11/167035 |
| Jun. 14, 1999 | (JP) | 11/167036 |
| Jan. 25, 2000 | (JP) | 2000/015344 |

(51) Int. Cl.⁷ ............................................. F16B 39/24
(52) U.S. Cl. .................. 411/149; 411/131; 411/147; 411/150; 411/161; 411/187; 411/188; 411/535; 411/536
(58) Field of Search ................. 411/149, 147, 150, 411/161, 535, 536, 187, 188, 131

(56) References Cited

U.S. PATENT DOCUMENTS

| 487,721 A | * | 12/1892 | Kalb | 411/350 |
| 625,529 A | * | 5/1899 | Andress | 411/136 |
| 910,712 A | * | 1/1909 | McCoy | 411/136 |
| 1,416,292 A | * | 5/1922 | Hatch | 411/144 |
| 2,271,732 A | * | 2/1942 | Chappuis | 411/158 |
| 3,263,727 A | * | 8/1966 | Herpolsheimer | 411/136 |
| 3,895,663 A | * | 7/1975 | Bashline et al. | 411/136 |
| 4,006,661 A | * | 2/1977 | Sims, Jr. | 411/11 |
| 4,034,788 A | | 7/1977 | Melone | |
| 4,538,313 A | * | 9/1985 | Frieberg | 470/42 |
| 4,708,555 A | | 11/1987 | Terry | |
| 4,812,095 A | * | 3/1989 | Piacenti et al. | 411/188 |
| 5,080,545 A | * | 1/1992 | McKinlay | 411/149 |
| 5,090,855 A | * | 2/1992 | Terry | 411/144 |
| 5,180,268 A | * | 1/1993 | Richardson | 411/536 |

(Continued)

FOREIGN PATENT DOCUMENTS

| DE | 684466 | * 11/1939 |
| JP | 51-119454 | 10/1976 |
| JP | 56-143612 | 3/1980 |
| JP | 1-173516 | 12/1989 |
| JP | 2-65709 | 7/1990 |
| JP | 7-38733 | 7/1995 |

Primary Examiner—Daniel P. Stodola
Assistant Examiner—Carlos Lugo
(74) Attorney, Agent, or Firm—Jordan and Hamburg LLP

(57) ABSTRACT

In a screw locking assembly a pair of washers having inclined surfaces are interposed between a screw member on a tightening side and a member to be tightened, with the inclined surfaces being mutually contacted. These inclined surfaces circle around once in spiral form with a lead angle β smaller than a lead angle α of the screw, and both ends thereof are connected with a tier face in the axial direction. By conducting an initial-tightening in a state with an interval of a preset angle maintained between the tier faces, and tightening and rotating the screw member on the tightening side until the tier faces come into contact with each other, a tightening force proportional to that angle is generated, and the tightening force is controlled surely with precision.

9 Claims, 17 Drawing Sheets

U.S. PATENT DOCUMENTS

| | | | | |
|---|---|---|---|---|
| 5,203,656 A | * | 4/1993 | McKinlay | 411/149 |
| 5,222,849 A | * | 6/1993 | Walton | 411/14 |
| 5,409,338 A | * | 4/1995 | McKinlay | 411/149 |
| 5,474,409 A | * | 12/1995 | Terry | 411/134 |
| 5,626,449 A | * | 5/1997 | McKinlay | 411/149 |
| 5,919,018 A | * | 7/1999 | Chuang | 411/149 |
| 5,967,724 A | * | 10/1999 | Terry | 411/149 |
| 6,347,915 B1 | * | 2/2002 | Balzano | 411/149 |

* cited by examiner

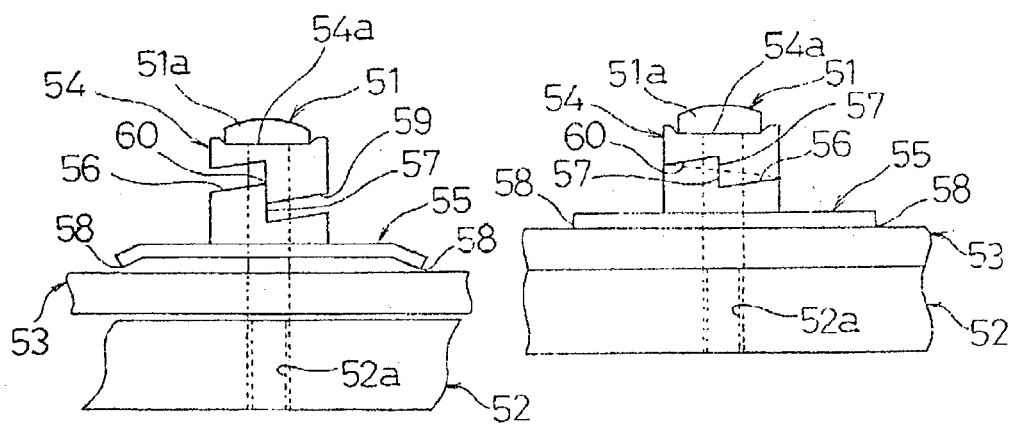

SCREW MECHANISM

TECHNICAL FIELD

The present invention relates to a screw mechanism that tightens and fixes a member to be tightened by making a male screw member and a female screw member screwed together, and particularly to a screw mechanism that surely control the tightening force with precision, and also surely prevent a screw from loosening by vibration, and achieve a highly reliable tightening condition.

BACKGROUND ART

Conventionally, when a member to be tightened is tightened and fixed by screwing a bolt or a nut to a female screw, a nut, or a bolt, the following method was generally adopted to prevent an occurrence of loosening due to insufficient tightening force (tightening axial force), or to prevent damage to a member due to excessive tightening force. That is, the tightening rotational torque was controlled to a prescribed value by tightening a bolt or nut with a torque wrench, in order to maintain an appropriate tightening state with a prescribed tightening force.

However, there was no guarantee that the tightening axial force actually applied to a bolt conformed to the designed value, even when the tightening rotational torque was kept constant, due to the friction coefficient between a head portion of a bolt or a nut and a washer, the friction coefficient between the washer and a member to be tightened, the dispersion of the friction coefficient on the screw surface, and deposits such as dust or oil on each of the contacting surfaces. Thereby the reliability of the tightening state was low. It was also necessary to tighten with multitudes of bolts and nuts for maintaining safety, causing an increase in weight, and a vicious circle was generated requiring an increase in bolts and nuts to correspond to the weight increase, and there was a problem of the cost increase.

Generally, a spring washer is interposed between the male screw member and the female screw member that are mutually screwed together, and tightened and fixed, or a locknut is used, as loosening-preventing-means in conventional screw mechanisms.

However, the spring washer does not necessarily perform a sufficient loosening-preventing-effect, and the locknut cannot always be used, because it is necessary to protrude the male screw member from the female screw member for a large amount, in order to use the locknut. Even when these loosening-preventing-means were installed, it was possible to loosen by rotating the nut or bolt in the opposite direction with the same torque used in the tightening. There was a demand for loosening-preventing-means that disabled loosening once the tightening has been done, even when the same torque as in tightening was applied in the opposite direction, for a more reliable loosening-preventing-means.

For one of such loosening-preventing-means, those disclosed in Japanese Patent Laid-Open Publication No. Hei. 10-122223 is known, for example. A description of this disclosure follows, with reference to FIG. 22, FIG. 23A, and FIG. 23B. In a case of fixing a mounting member 53 to a female screw member 52, which has a female screw 52a formed, using a male screw member 51 such as a bolt having a threaded portion 51b, a pressing member 54 that is integrally coupled with a head portion 51a in the rotating direction, and a washer 55 that is integrally coupled with the mounting member 53 in the rotating direction, are interposed between the head portion 51a of the male screw member 51 and the mounting member 53.

A spiral-form cam face 56 that gradually heightens along the circumference in the counterclockwise direction, and a tier face 57 in an axial direction that connects both ends of the cam face 56 are formed on one end face of the washer 55. There is a dig-in-portion 58 formed on the other end face of the washer 55 that digs-in to the mounting member 53 and integrally couples therewith in the rotating direction. A mating groove 54a is formed on one end face of the pressing member 54, which integrally couples with the head portion 51 a in the rotating direction by mating therewith. And a spiral-form cam face 59 that face-contacts with the cam face 56, and a tier face 60 that connects both ends of the cam face 59 are formed on the other end face. The leads of the cam faces 56 and 59 are configured to be bigger than the screw leads of the screw members 51 and 52.

In the above-mentioned construction, the bolt 51 is inserted into the pressing member 54 and the washer 55, and the bolt 51 penetrates the mounting member 53 and screwed together with the female screw member 52, and tightened together firmly. This causes the bolt 51 and the pressing member 54 to integrally rotate with the head portion 51a and the groove 54a mating together, and the washer 55 also rotates through the interposition of the mating tier faces 57 and 60, and is pressed firmly to the mounting member 53 in the axial direction by the lead of the screw. The dig-in-portion 58 of the washer 55 digs into the mounting member 53, and the washer 55 and the mounting member 53 are integrally coupled in the rotating direction (particularly in the loosening rotating direction). In this state, the mounting member 53 is tightened together and fixed to the female screw member 52 by the bolt 51, through the interposition of the pressing member 54 and the washer 55.

When the bolt 51 and the female screw member 52 tries to rotate in a relative loosening direction in this state, the bolt 51 is moved in the axial direction through the mating of the cam faces 56 and 59, since the female screw member 52 is integrated in the rotating direction with the cam face 56 of the washer 55 through the interposition of the pressing member 53, and since the bolt 51 is integrated in the rotating direction with the cam face 59 of the pressing member 54. And because the leads of the cam faces 56 and 59 are bigger than the screw leads of the bolt 51 and the female screw member 52 screwed together, a strong tensile force in the axial direction is acted on the bolt 51, and prevents the relative rotation of the bolt 51 and the female screw member 52 in the loosening direction.

Furthermore, in Japanese Examined Utility Model Publication No. Sho. 37-3016 and Japanese Examined Utility Model Publication No. Sho. 37-31930, mechanisms are disclosed in which a pressing member 54 is integrated with a head portion 51a of a bolt 51, a washer 55 is in a ring shape, and notches or multitudes of protrusions are formed on the underside of the washer 55, as non-slip-means.

In order to achieve a desired loosening-preventing-effect with the above-mentioned construction, the cam faces 56 and 59 have to be processed with high precision so that a slip is surely generated between the cam faces 56 and 59, before a slip is generated between the bolt 51 and the pressing member 54, or between the washer 55 and the mounting member 53. However, it is especially difficult to process the bordering portions between the cam faces 56, 59, and the tier faces 57, 60, in high precision, and the above-mentioned effects cannot be achieved when there is unevenness or protrusions in this border portion. Hence, there was a problem that the cost became high due to the high precision processing, and not practical.

In a state just before the completion of the tightening in the above-mentioned construction, the bolt 51 and the pressing member 54 are integrated in the rotating direction, and this pressing member 54 and the washer 55 are mated together in the rotating direction through the interposition of the tier faces 60 and 57. Hence, when the bolt 51 is tightened and rotated, the washer 55 is required to rotate with the dig-in-portion 58 digging into the mounting member 53, and most of the rotating torque was required for the rotation of the washer 55, and did not contribute sufficiently to the tightening-torque of the washer 51. So there was a problem that not enough tightening force was achieved for the mounting member 53, in comparison to the applied rotation torque, and a shortage of the tightening force occurred.

On the other hand, in order to achieve a loosening-preventing-effect, there was a need to generate a slip between the cam faces 56 and 59, by making the bolt 51 and the pressing member 54 integrated in the rotating direction, as noted above, and making the pressing member 54 simultaneously rotated when the bolt 51 rotates in the loosening direction, and rotate relative to the washer 55 which is integrated in the rotating direction with the mounting member 53. Hence, it was necessary to be constructed in such a manner that a slip did not generate between the bolt 51 and the pressing member 54, before a slip was generated between the cam faces 56 and 59. And there was a problem that it was difficult to fulfill both of these requirements.

When a large rotating torque is added to the bolt 51 in order to achieve the necessary tightening force, a large load is acted on the tier faces 60 and 57 of the pressing member 54 and the washer 55. There is fear of an excessive stress-concentration generating at the corner to thereby generate a crack, and fear of damaging the pressing member 54 or the washer 55. An expensive material or a heat-treatment is required to prevent such an occurrence, and there was a problem that the cost increases.

In case of tightening and fixing a mounting member with low anti-crack characteristics, such as glass or ceramics, it was not possible to tighten firmly because there was fear of generating a crack due to the tightening. And there was a problem that it was very difficult to achieve a loosening-prevention effect.

In light of the above-mentioned conventional problems, an object of the present invention is to provide a tightening method for screws, and a screw mechanism, which surely controls the tightening force with precision, and achieve a highly reliable tightening state.

Another object of the present invention is to provide a loosening-preventing apparatus for the screw mechanism, which achieves a positive non-loosening-effect with practical processing costs, and which surely tightens and fixes even a mounting member with low anti-crack characteristics.

DISCLOSURE OF THE INVENTION

A screw mechanism of the present invention, has a pair of inclined surfaces interposed between a screw member on the tightening side and a member to be tightened in a mutually contacting state, in a screw mechanism making a member to be tightened be tightened and fixed by screwing one screw member on the tightening side to the other screw member. The inclined surfaces circle around once in spiral form with a lead smaller than the lead of the screw, and both ends are connected with a tier face in the axial direction. With this construction, an initial-tightening is done in a state with an interval of a preset angle maintained between the tier faces of the pair of inclined surfaces. After that, the screw member on the tightening side is tightened and rotated until the tier faces come into contact with each other. In this way, the rotating amount of the screw member on the tightening side is limited explicitly with accuracy, by the tier faces coming into contact, and the tightening force is controlled with precision, in the operation of the tightening. Also, by interposing the inclined surfaces, a tightened state with the required tightening force acted is easily achieved with a small rotating torque for the tightening, compared to a case in which only a screw is used. Since no rotating force is acted on the member to be tightened during the tightening-rotation due to the slip between the inclined surfaces, there is no need to fix firmly after the member to be tightened has been positioned, and the tightening operation is conducted with effective workability.

The above-mentioned pair of inclined surfaces can be formed on the mutually contacting surfaces of a pair of washers interposed between the screw member on the tightening side and the member to be tightened. Alternatively, one of the pair of inclined surfaces can be formed on a surface on the member to be tightened side of the screw member on the tightening side, and the other inclined surface can be formed on the washer interposed between the screw member on the tightening side and the member to be tightened.

Furthermore, when the outer circumference of the above-mentioned washer is made roughly the same shape as a mating portion having a different diameter that transfers the tightening-torque applied on the outer circumference of the screw member on the tightening side, it is possible to easily limit the mutually rotating position between the screw member on the tightening side and the washer, or between the washers, by mating a spanner to the mating portion having a different diameter of the screw member on the tightening side and the washer during initial tightening.

When the mating portion having a different diameter on the washer with the inclined surface formed thereon, or on the screw member on the tightening side, is made of a polygonal column. When there are designated codes or symbols with regularly increasing values sequentially appended to the sequentially adjacent side faces next to the side face corresponding to the formed position of the tier surface, in one direction in the direction of the inclination, the following can be done. Since the added total of the codes or symbols corresponding to each other indicates the angle between the tier faces of the pair of inclined surfaces, the tightening force can be understood explicitly at-a-glance with the added total of the codes or symbols, by having the relation of the added total and the tightening force put in a table beforehand.

When both of the washers are pre-fixed, so that they break away with the rotating torque in the tightening, in a state where the inclined surfaces of the pair of washers coming in contact with each other, and a prescribed interval is placed between the tier faces, the following can be done. First, the pair of washers are handled as a single piece and placed between the member to be tightened and the screw member on the tightening side, and an initial-tightening is done lightly on the screw member on the tightening side. Then, when the screw member on the tightening side is rotated strongly by mating a spanner or the like, the screw member on the tightening side and one of the washers integrally rotate, because the rotating resistance between the inclined surfaces of the pair of washers is the smallest. Then it is rotated until the tier faces come in contact with each other. By operating in this manner, it is possible to surely control the tightening force to a prescribed value with excellent precision.

When a graduation is formed on the outer circumference of the washer, along one direction of the inclination of the inclined surface starting from the formed position of the tier face, it is possible to easily perceive the interval size when configuring the interval between the tier faces, and also to configure a prescribed tightening force.

As pre-fixing means, there are means that have adhesive tapes pasted on the whole circumference of the washers, and means that have the outer circumference edges of the opposing inclined surfaces adhered and fixed by an adhesive, or the like. However, the operability is made extremely good, when the pre-fixing means is constituted by adhesive tapes pasted on the outer circumference of the washers, and have the achievable tightening axial force indicated on the outside of the tape.

When the pre-fixing means is constituted by adhesive tapes pasted on the outer circumference of the washers, and tear-off-cuts are provided intermittently in the circumference direction on the adhesive tape in the vicinity of the contacting face of both of the washers, the following is possible. Both of the washers are surely pre-fixed during the initial-tightening, and when the screw member on the tightening side is further rotated to be tightened, the adhesive tape is cut-off and separated at the tear-off-cuts, and the adhesive tape is not left in a torn-off unsightly state. Furthermore, by setting the strength of the adhesive tape or the interval between the tear-off-cuts to an appropriate value, an appropriate initial-tightening is done and then automatically shifted to a tightening-process, simply by interposing this pair of washers and conducting the tightening-operation. As a result, the tightening-process is conducted with effective workability.

When it is pre-fixed with grease applied between the inclined surfaces of both of the washers, the frictional resistance between the inclined surfaces is decreased, and it is possible to control the tightening force with an even higher reliability.

The double nut of the present invention is constituted in such a manner that an inclined surface is formed on mutually pressure-contacting surfaces of a pair of nut members composing the double nut. This inclined surface circles around once in spiral form with a lead smaller than the lead of the screw, and both ends are connected with a tier face in the axial direction. Then both of the inclined surfaces are brought into contact with each other, and an interval is provided between the tier faces in the rotating direction, while the processing of the female screw is conducted in this condition. When both of the nut members are tightened, and the upper nut is further tightened until the tier faces come into contact with each other, a robust whirl-stop effect is exerted more surely, with a small rotating torque, similar to the above-mentioned example.

The tightening method of the screw mechanism of the present invention is a tightening method that makes the member to be tightened being tightened and fixed by screwing one screw member on the tightening side to the other screw member. In this tightening method, an initial-tightening is done to the screw member on the tightening side with an initial rotating torque, and then the screw member on the tightening side is further tightened and rotated for a preset angle. After a state of no play is achieved by the initial-tightening, the screw member on the tightening side is rotated for a set angle, causing a tensile strain corresponding to the multiplied value of the lead of the screw and the rotating angle, to generate in the screw axis. Also a tightening axial force is generated, equaling the multiplied value of this tensile strain, the elastic modulus, and the cross-sectional area of the screw axis. This makes it possible to surely control the tightening force with the rotating angle of the screw member on the tightening side with precision.

In this case, by making this tightening axial force generated by the initial-tightening be within one-tenth of the tightening axial force on the completion of the tightening, the tightening axial force is prescribed mainly by the rotation of the screw member on the tightening side. It is also possible to control the tightening force with even more precision, because the tightening axial force generated by the initial-tightening is limited to be essentially within the tolerated margin of error.

A pair of inclined surfaces is interposed between a screw member on the tightening side and a member to be tightened in a mutually contacting state, and the inclined surfaces circle around once in spiral form with a lead smaller than the lead of the screw, and both ends are connected with a tier face in the axial direction. Then an initial-tightening is done in a state with an interval of a preset angle maintained between the tier faces of the pair of inclined surfaces, and then the screw member on the tightening side is tightened and rotated until the tier faces come into contact with each other. In this way, the tightening force is controlled with precision by limiting the rotating amount of the screw member on the tightening side explicitly and accurately with the tier faces coming into contact, during the tightening operation. It is also possible to easily achieve a tightening state with a prescribed tightening force acted, with a rotating torque with the value of the torque required in the case with only a screw, multiplied by the ratio of the difference between the lead of the screw and the lead of the inclined surface, to the lead of the screw, for example, one-half the original torque when the lead of the inclined surface is one-half of the lead of the screw, and two-third the original torque when the lead of the inclined surface is one-third of the lead of the screw. Since no rotating force is acted on the member to be tightened during the above-mentioned tightening-rotation due to the slip between the inclined surfaces, there is no need to fix firmly after the member to be tightened has been positioned, and tightening is conducted with effective workability.

The screw mechanism of this invention intended to prevent loosening is provided with a first inclined surface on one screw member of either of the male screw member and the female screw member which are tightened and fixed by screwing with each other, or on a member that integrally rotates with aforementioned screw member relative to the other member. This first inclined surface circles around once and both ends of the inclined surface are connected with a tier face in the axial direction. There is also a second inclined surface provided on the other screw member of either the male screw member or the female screw member, or on a member that integrally rotates with this screw member. This second inclined surface face-contacts with the first inclined surface, and both ends of this inclined surface are similarly connected with a tier face in the axial direction. The spiral lead of both of these inclined surfaces are configured to be bigger than the screw lead of both of the screw members, and a recess-concave-portion is provided on the end portion next to the tier face of the inclined surface.

In this kind of construction, when both of the screw members try to rotate in a relative loosening direction, a large tensile force is acted in the axial direction on the screw members, and a relative rotation of both of the screw members in a loosening direction is prevented, since the spiral leads of both of the inclined surfaces are configured to be bigger than the screw lead. Furthermore, since recess-concave-portions are provided in the end portion next to the tier face, which are difficult places to process, it is possible to process with high precision at relatively low cost, and the contacting area between the inclined surfaces is also decreased to make the sliding friction smaller. These make it possible to perform a positive non-loosening-action at a practical cost. Furthermore, by providing the recess-concave-portions, a clearance is generated between both of the inclined surfaces for a prescribed range in the circumference direction. Furthermore, in a state of reverse-lock which generates a non-loosening-load between the screw members by actively rotating one of the screw members in the loosening direction, a bending effect to the clearance side is acted on one of the screw members due to this clearance. The rotation of the screw member is prevented, by firmly pressing one end side and the other end side of the screw in the diameter direction to the opposite direction due to this bending-stress. Hence the reverse-lock effect is ensured, and an even bigger non-loosening-effect is achieved.

When in a state of reverse-lock by rotating in the opposite direction of the tightening direction and locking after tightening and fixing the male screw member and the female screw member, stoppers, which maintain the reverse-lock state by mutually mating together, are installed in protrusion on the recess-concave-portion of the inclined surface, the reverse-lock state is maintained by the stoppers, and a positive non-loosening-effect is surely maintained much more.

It is preferred that the member that is integrated in the rotating direction with the male screw member or the female screw member is constituted by a washer provided with non-slip-means on the seat portion on one end side, and an inclined surface, a tier face, and a recess-concave-portion formed on an end face of a cylindrical portion thereof on the other end side. Thus, it is possible to achieve an effective non-loosening-effect just by using this washer, even when using ordinary bolts and nuts.

The screw mechanism of this invention is provided with a first inclined surface on one screw member of either the male screw member or the female screw member that are mutually screwed together, or on a member that integrally rotates with aforementioned screw member relative to the other member. This first inclined surface circles around once and both ends of the inclined surface are connected with a tier face in the axial direction. Also a washer is provided, which has a second inclined surface face-contacting with the first inclined surface and both ends of this second inclined surface being connected similarly with a tier face in the axial direction, and non-slip-means on the seating-face on the other side of the inclined surface. The spiral leads of both of these inclined surfaces are configured to be bigger than the screw lead of both of the screw members. A member to be tightened with low anti-crack characteristics against pressure, such as glass, ceramic, or plastic, is tightened-together-and-fixed between a member integrated in the rotating direction with the other screw member of either the male screw member or the female screw member, and the washer. When tightening one member of either the male screw member or the female screw member, the burden of the rotating torque is shared by the friction force between the non-slip-means of the washer, and the member integrated in the rotating direction with the other screw member of either the male screw member or the female screw member. The tightening force becomes constant even when the rotating torque gets bigger than a prescribed value, because the sharing of the burden becomes close to one hundred percent when the tightening force becomes bigger than a prescribed value. Therefore, a member to be tightened with low anti-crack characteristics is tightened-together-and-fixed safely and surely, while preventing loosening.

The screw mechanism of this invention, which is intended to prevent loosening, has the followings arranged between the opposing surfaces of the screw member on the tightening side and the member to be tightened, in a screw mechanism making a member to be tightened be tightened and fixed by screwing and tightening one screw member to the other screw member. There is arranged a first washer that has an inclined surface that circles around once and both ends of the inclined surface are connected with a tier face in the axial direction. And there is arranged a second washer that has an inclined surface that face-contacts with the inclined surface of the first washer and both ends of this inclined surface are similarly connected with a tier face in the axial direction. The spiral leads of the inclined surfaces of both of these washers are configured to be bigger than the screw lead of the screw members. And it is also constituted so that the friction force between the screw member on the tightening side and the first washer before and after the completion of the tightening, is made bigger than the friction force between the inclined surfaces of both of the washers, and smaller than the friction force between the second washer and the member to be tightened.

With this construction, the screw member on the tightening side is tightened and rotated, and on the way, the first washer pressure-contacts to the opposing surface of the screw member on the tightening side, and the first washer integrally rotates in the rotating direction. Since the first washer and the second washer are mated together through the interposition of the tier faces, the second washer also rotates relative to the opposing face of the member to be tightened, and the tightening of the screw member on the tightening side advances. When it is just before the completion of the tightening, the second washer is pressure-contacted firmly to the member to be tightened, and a large friction force is generated and stops the rotation, and the first washer also stops in correspondence. By further tightening-rotating the screw member on the tightening side, it is possible to tighten while generating a slip between the first washer, and as a result, sufficient tightening force is maintained upon the completion of the tightening. In the final stage of the above-mentioned tightening, there is no excessive load acted on the tier faces of the first and second washers, hence there is no fear of being damaged with cracks, caused by stress-concentration being acted on the corner of the tier faces.

When the screw member on the tightening side tries to rotate relatively in a loosening direction from a tightening completed state, the screw member on the tightening side and the first washer integrally rotate, since the friction force between both of these is bigger than the friction force between the inclined surfaces of both of the washers. Furthermore, since the spiral leads of both of these inclined surfaces are configured to be bigger than the screw lead, a big tensile force is acted on the screw members in the axial direction, and the relative rotation of both of the screw members in a loosening direction is prevented, and a high loosening-preventing-effect is achieved.

In addition, in case of canceling the tightening, it is easy to cancel with about the same rotating torque as in tightening, by rotating the screw member on the tightening side in the opposite direction while holding the rotation of the first washer. Therefore, it is preferred that a different-diameter-parallel-face is formed on the outer circumference of the first washer, which mates with a spanner or the like.

When the spiral lead angle of the inclined surface is made to be two times or less the lead angle of the screw, and a reverse-lock for locking by rotating in the opposite direction of the tightening direction after tightening the screw member on the tightening side is conducted, it is possible to achieve a tightening force bigger than those achieved when tightened with the same rotating torque. That is, in reverse-lock, it is possible to achieve a tightening force of the same value as when tightened by a screw having a lead angle with a value equal to the difference between the spiral lead angle of the inclined surface and the lead angle of the screw. For example, two times the tightening force is achieved with 1.5 times the lead angle. However, the non-loosening-effect itself is lost, when it is nearly the same as the lead angle of the screw.

When the friction force between the screw member on the tightening side and the first washer is configured to be two to four times the friction force between the inclined surfaces of both of the washers, and also as small as possible within the range of being surely bigger than the friction force between the inclined surfaces of both of the washers, it makes it difficult to countervail the tightening-rotating-force of the screw member on the tightening side by the friction force between the screw member on the tightening side and the first washer, thereby an even stronger tightening force is maintained.

When a non-slip-protrusion-group is provided on the seating-surfaces that contact with each of the opposing surfaces of the screw member on the tightening side and the member to be tightened, and the hardness of the opposing surface of the screw member on the tightening side is made to be lower than the hardness of the non-slip-protrusion-group, and the hardness of the opposing surface of the member to be tightened is made to be lower than the hardness of the opposing surface of the screw member on the tightening side, the above-mentioned action and effect is achieved easily and surely, due to following reason. Since the friction force increases by making the non-slip-protrusion-group dig in to the opposing surface of the member to be tightened even harder, even when using the same washers having a non-slip-protrusion-group installed on the seating-surface as the first and second washers, the friction force between the screw member on the tightening side and the first washer can be made smaller than the friction force between the member to be tightened and the second washer.

When a non-slip-protrusion-group is provided on the seating-surfaces that contact with each of the opposing surfaces of the screw member on the tightening side and the member to be tightened, and a non-slip-protrusion-group of a different pitch is provided on the opposing surface of the screw member on the tightening side, the above-mentioned action and effect is achieved easily and surely, due to following reason. The friction force between the screw member on the tightening side and the first washer can be made smaller, because the friction force decreases with the non-slip-protrusion-group of a different pitch coming in contact.

When the non-slip-protrusion-group is constituted by plural streaks of non-slip-protrusion-bands in the annular or radius direction, and arranged and installed with an appropriate interval, the forming of the non-slip-protrusion-group by a knurling process is made easy, and the control of the friction force is also done easily.

When a friction-force-adjusting-sheet is interposed between the opposing surface of the screw member on the tightening side and the seating-surface of the first washer, the following is possible. It is possible to achieve a state in which, the friction force between the opposing face of the screw member on the tightening side and the seating-surface of the first washer is as small as possible within the range of being bigger than the friction force between the inclined surfaces, easily with precision. When the friction-force-adjusting-sheet is composed of a cloth or a paper containing abrasive-grains, it is possible to achieve a friction force surely, compared to a case in which a thin metal sheet is used, for example, and the friction force is adjusted with precision. And the cost will be low, and the handling easy.

A latching-ring has a planar and C-lettered form, and is capable of being elastically fit onto the outer circumference of the first and second washers, and has a tongue piece installed in protrusion on the inner circumference thereof. This tongue piece fits into a clearance generated between the tier faces of the first and second washers, in a state of reverse-lock, which locks by rotating in the opposite direction of the tightening direction after tightening the screw member on the tightening side. When this latching-ring is installed, and fit onto the outer circumference of the first and second washers, the state of reverse-lock is surely maintained by the tongue piece. This prevents the occurrence of a situation in which the screw member on the tightening side and the first washer rotate along the inclination of the inclined surface due to vibration, the reverse-lock is canceled unexpectedly, and the non-loosening-effect is decreased.

BRIEF DESCRIPTION OF DRAWINGS

FIG. 23A is a front view of a midway state of a tightening, and FIG. 23B is a front view of a tightened state, in the same conventional example.

BEST MODE FOR CARRYING OUT THE INVENTION

Figure 1:
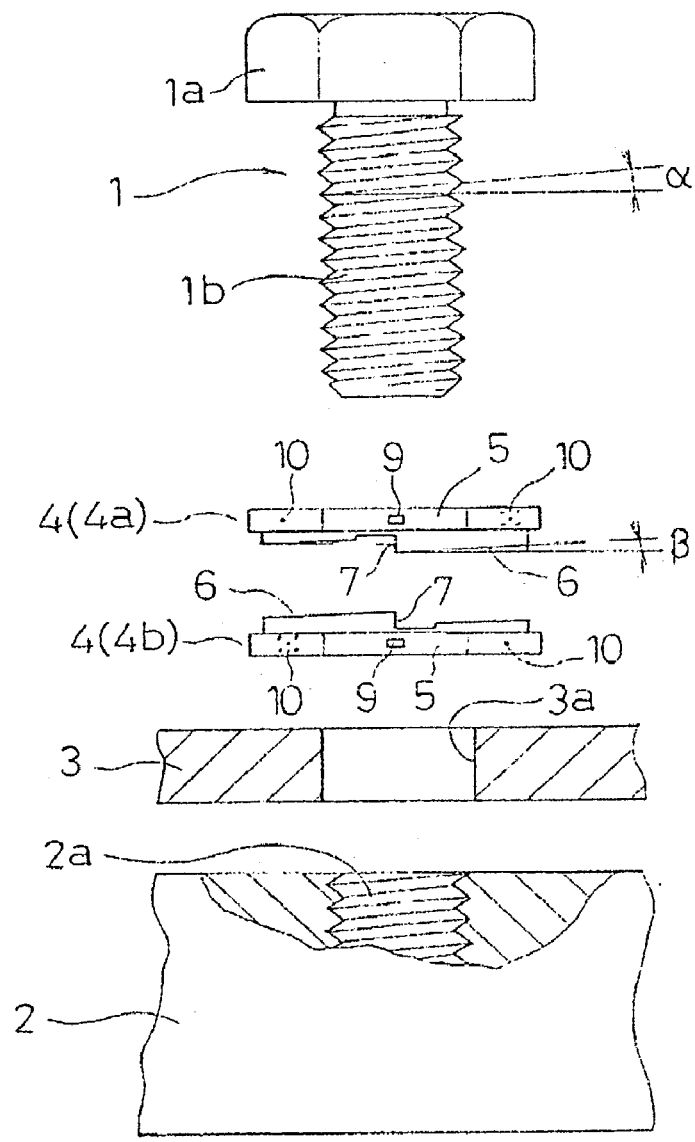
FIG. 1 is a partial sectional front view showing a first embodiment of a screw mechanism according to the present invention, in exploded form.

A first embodiment of a screw mechanism and a tightening method of the present invention will be described in the following, with reference to FIG. 1 to FIG. 5.

In FIG. 1 to FIG. 4, reference numeral 1 denotes a male screw member consisting of a bolt, reference numeral 2 denotes a female screw member consisting of a construction member that has a female screw 2a formed thereinside. In this embodiment indicated is a case in which a member 3 to be tightened is arranged on top of this construction member 2, and tightened and fixed to the female screw member (construction member) 2, by making the male screw member 1 penetrate through a bolt hole 3a formed on the member 3 to be tightened.

Figure 2:
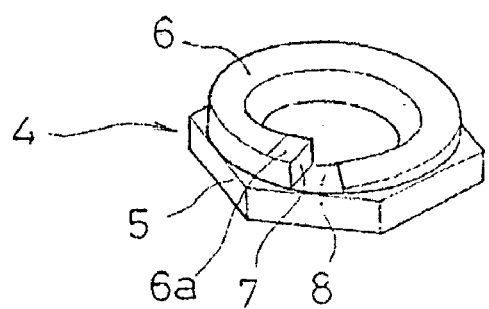
FIG. 2 is a perspective view of a washer in the same embodiment.

The male screw member 1 has a hexagonal head portion 1a and a male screw 1b, and a pair of washers 4 (4a, 4b) of the same construction are interposed between this head portion 1a and the member 3 to be tightened in a mutually upside-down direction, in a state of being fitted to the outer circumference of the male screw 1b. As shown in FIG. 2, the washer 4 is constituted so that an inclined surface 6 is formed on top of a thin hexagonal seat portion 5 of the same shape as the head portion 1a of the male screw member 1. This inclined surface 6 spirals one turn, and heightens upward while going counterclockwise. The washer 4 is also constituted, so that both ends of the inclined surfaces 6 are connected with a tier face 7 in the axial direction. Furthermore, a recess-concave-portion 8 is formed on the edge portion of the inclined surface 6 adjacent to the lower edge of the tier face 7, by incising and cutting off in planar sector form, so that it is possible to process the inclined surface 6 in high precision with relatively low cost. A flat portion 6a is formed on the top portion of the inclined surface 6, to constitute it so that a smooth slip is not obstructed by an occurrence of scoring between the inclined surfaces 6, 6, when the male screw member 1 is tightened and rotated. The hardness and smoothness of the inclined surface 6 are configured to be higher than the hardness and smoothness of the screw.

The lead-angle $\beta$ of the inclined surface 6 is configured to be smaller than the lead-angle $\alpha$ of the male screw 1b or the female screw 2a. It is preferred that the lead-angle $\beta$ of the spiral of the inclined surface 6 is configured to be 0.3 times the screw lead-angle $\alpha$ or more, and 0.7 times the screw lead-angle $\alpha$ or less.

Among the side faces of the hexagonal cylinder on the circumference of the seat portion 5 of each washer 4, there is a base point mark 9 appended on a position corresponding to the tier face 7. And there are also rotational position marks 10, which are composed of codes or symbols with regularly increasing value, sequentially appended to the sequentially adjacent side faces in the direction of the inclined surface 6 height getting gradually higher, next to the above-mentioned side face corresponding to the tier face 7. As shown in the example shown in FIG. 1, FIG. 3A, FIG. 3B, and particularly in FIG. 4A and FIG. 4B where it is shown explanatorily on the circumference of the washer 4, the base point mark 9 is indicated by a square mark, and the rotational position marks 10 are indicated by sequentially increasing numbers of black dots.

In case of mounting the member 3 to be tightened on the construction member (female screw member) 2 and tightening and fixing with the male screw member 1, in the above constitution, the male screw member 1 is inserted through a pair of washers 4 (4a, 4b), and the male screw 1b is allowed to penetrate through the member 3 to be tightened and screwed together with the female screw 2a of the female screw member 2.

In this case, the tier faces 7, 7 of the upper washer 4a and the lower washer 4b are placed in a state with a prescribed interval between them. Then an initial-tightening is done to a state shown in FIG. 3A and FIG. 4A, by mating together a spanner with the head portion 1a of the male screw member 1 and rotating the spanner, while holding the outer circumference of both of the washers 4a and 4b so that they do not move relative to each other in the rotating direction. In the illustrated example, there is a 120-degree interval formed between the tier faces 7, 7. In this state, the added total of the number of black dots on the mutually corresponding rotational position marks 10 on both of the washers 4a and 4b are all two's, in-between both of the base point marks 9 of both of the washers 4a and 4b. The total becomes one when the interval between the tier faces 7, 7 is 60 degrees, three when 180 degrees, 4 when 210 degrees, and the added total of the number of black dots and the interval between the tier faces 7, 7 are related proportionally.

It is also possible to mate together the spanner with the head portion 1a of the male screw member 1 and the washers 4a and 4b at the same time, and tighten them. It is sufficient to tighten so as not to leave any play in this initial-tightening, and it is possible to tighten the male screw member 1 by hand while holding both of the washers 4a and 4b so that it does not rotate between them, and not use a spanner. If anything, dispersion in precision of the tightening axial force after the subsequent full-scale tightening will occur, when the initial-tightening using the spanner was too strong. By making this tightening axial force generated by the initial-tightening be within one-tenth of the tightening axial force on the completion of the tightening, it is possible to keep the tightening axial force generated by the initial-tightening to be essentially within the tolerated margin of error, and control the tightening force with precision.

Figure 3A:
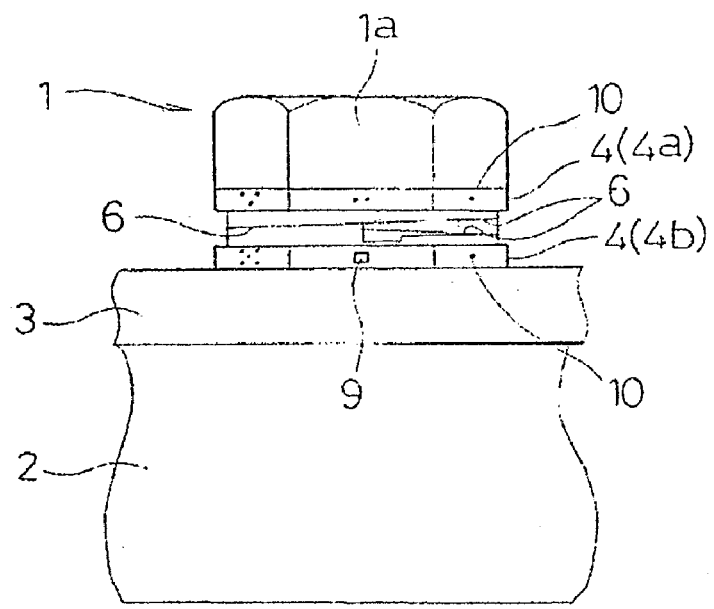
FIG. 3A is a front view of an initially tightened state.
Figure 3B:
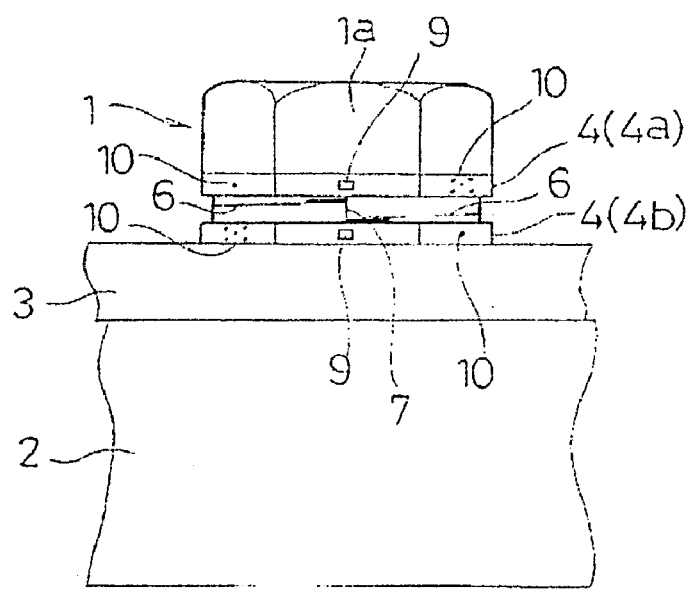
FIG. 3B is a front view of a state upon completion of the tightening, in a tightening-process.
Figure 4A:
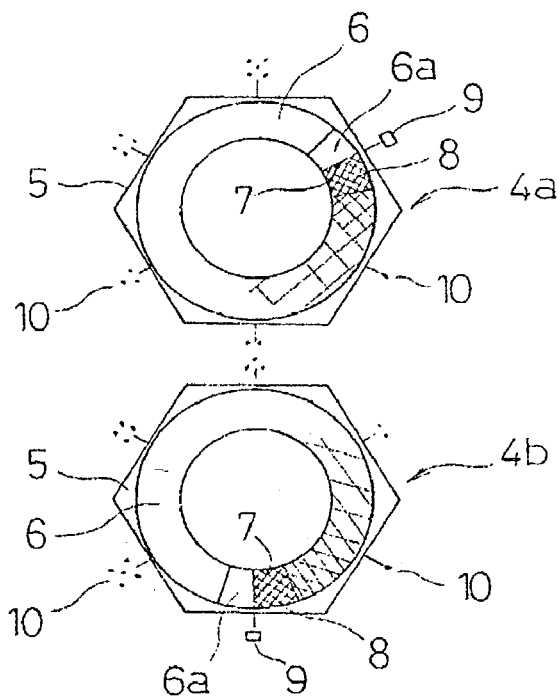
FIG. 4A is a plan view of a rotating position of a pair of inclined surfaces in an initially tightened state, shown in vertically parallel position.
Figure 4B:
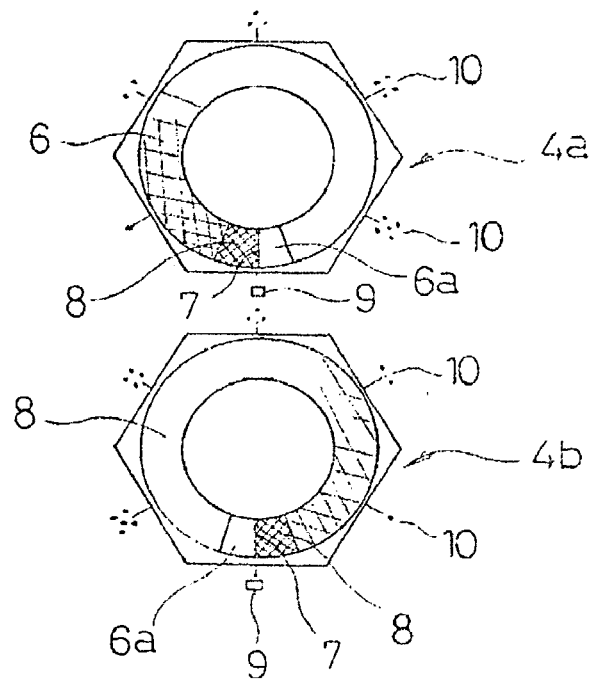
FIG. 4B is a plan view of the rotating position of the pair of inclined surfaces in a state upon completion of the tightening, shown in vertically parallel position.
Figure 5:
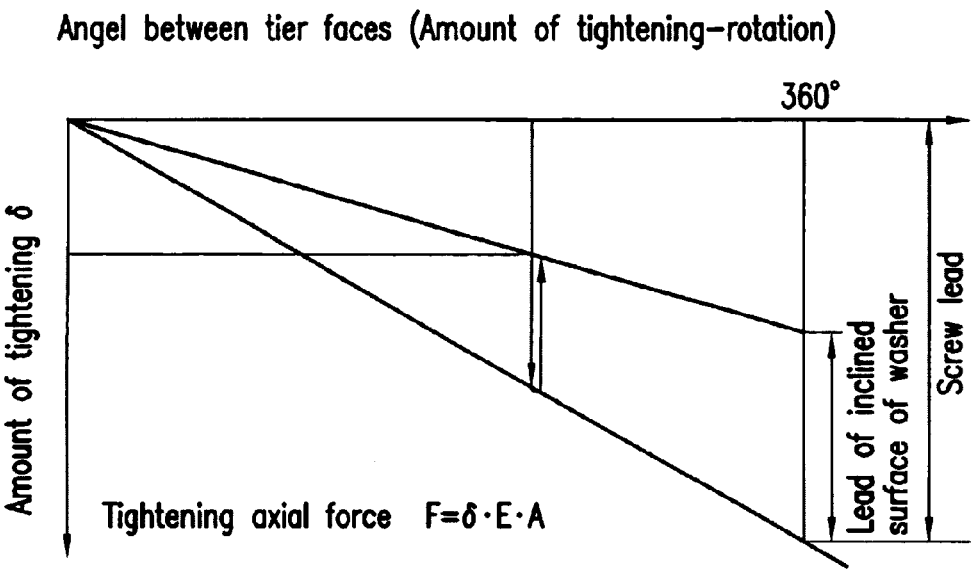
FIG. 5 is a graph showing a relation of an angle between two tier faces of the pair of inclined surfaces, and an amount of tightening.

After a state of no play is achieved by the above-mentioned initial-tightening, the spanner is mated together only with the head portion 1a of the male screw member 1, or only with the head portion 1a and the upper washer 4a, and the spanner is rotated. This rotates the male screw member 1 and the upper washer 4a in respect to the member 3 to be tightened and the lower washer 4b, and tightens and rotates until the tier faces 7, 7 of both of the washers 4a and 4b are brought into contact, as shown in FIG. 3B and FIG. 4B. In the illustrated example, tightening-rotation is done for 120-degrees angle between the tier faces 7, 7.

The reason why it rotates by generating a slip between the washers 4a and 4b when only the head portion 1a of the male screw member 1 is rotated, is that the rotating resistance between the inclined surfaces 6, 6 of the washers 4a and 4b is smaller than the rotating resistance between the non-inclining surfaces of the head portion 1a and the washer 4a, and the rotating resistance between the non-inclining surfaces of the washer 4b and the member 3 to be tightened. When grease is applied between the inclined surfaces 6, 6, slip can be generated without damage or the like to the inclined surfaces 6, and along with the existence of a flat portion 6a of the inclined surface 6, it is possible to use the washers many times in repetition. Since a slip is generated between the washers 4a and 4b when the head portion 1a of the male screw member 1 is rotated, as noted above, the member 3 to be tightened will not rotate due to the tightening rotational torque. Hence there is no need to fasten firmly in the tightening operation, once the member 3 to be tightened is initially positioned, and the tightening operation is done easily. The above-mentioned effect is performed with reliability, by having the hardness and smoothness of the inclined surface 6 greater than those of the screw portion.

By tightening and rotating the male screw member 1 for a prescribed angle in this way, a tensile strain (=amount of tightening d) generates in the male screw member 1, equal to the amount of the difference between the screw lead and the lead of the inclined surface 6 multiplied by the rotating angle. Also, a tightening axial force "F" that is equal to the value of this tensile strain multiplied by the elastic modulus "E" and the cross-sectional area "A" of the male screw member 1 is generated. In this way, the tightening axial force is controlled surely and with precision, by tightening-rotating only for the angle between the tier faces 7, 7. Therefore, the intended tightening axial force for the tightening operation can be understood explicitly at-a-glance, by having the corresponding relation of the above-mentioned added total of the numbers of the black dots and the achievable tightening axial force in a table, in accordance with the diameter and material of the male screw member 1.

The rotating torque in the above-mentioned tightening can also be made smaller compared to that using only the screw, by interposing washers 4 (4a, 4b) that have inclined surfaces 6. That is, it is possible to easily achieve a tightening state with a prescribed tightening axial force acted, with a rotating torque equal to the original torque multiplied by the ratio of the difference between the lead of the screw and the lead of the inclined surface 6, to the lead of the screw. Such as, one-half the original torque when the lead of the inclined surface 6 is one-half of the lead of the screw, and two-thirds the original torque when the lead of the inclined surface 6 is one-third of the lead of the screw.

In this way, when the lead angle $\beta$ of the inclined surface 6 is nearly the same value as the lead angle $\alpha$ of the screw, the tightening rotational torque can be made small, but on the other hand, the amount of tightening is decreased and a big tightening axial force cannot be achieved. On the contrary, when the lead angle $\beta$ of the inclined surface 6 is nearly zero, the amount of tightening is increased and a big tightening axial force is achieved. On the other hand, the required tightening rotational torque is the same as the tightening rotational torque when only the screw is used, and a big tightening rotational torque is required. Therefore, as mentioned above, it is preferred that the lead-angle $\beta$ of the spiral of the inclined surface 6 is configured to be 0.3 times the lead-angle $\alpha$ of the screw or more, and 0.7 times the lead-angle $\alpha$ or less.

Figure 6:
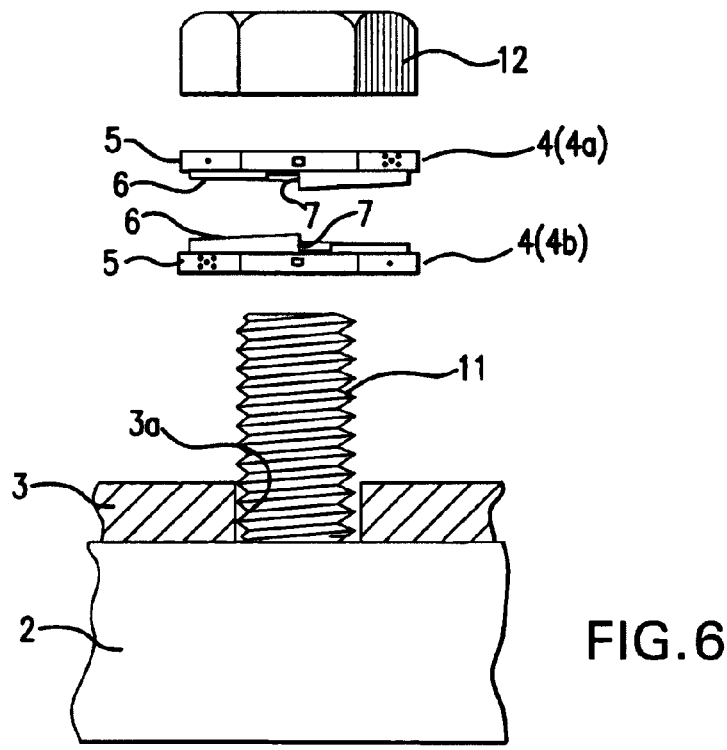
FIG. 6 is a partial sectional front view showing a second embodiment of the screw mechanism according to the present invention, in exploded form.

A second embodiment of the present invention is described in the following, with reference to FIG. 6. In the above-mentioned embodiment, an example was indicated that used the male screw member 1 having the head portion 1a, and the female screw 2a was formed on the construction member to form the female screw member 2. However in this embodiment, it is constituted so that a male screw member 11 is embedded and fixed to a construction member 2, and a member 3 to be tightened is arranged on top of the construction member 2, by making the male screw member 11 inserted through a bolt hole 3a formed on the member 3 to be tightened to tightened this member 3 to be tightened with a nut member 12 acting as a female screw member. In this case, the same action and effect with the above-mentioned embodiment is also performed, by making a pair of washers 4 (4a, 4b) be interposed between the nut member 12 and the member 3 to be tightened.

In this embodiment, an example of a case in which the male screw member 11 was fixed to the construction member 2 was shown. However, it is also possible to have the male screw member 11 constituted by a male screw member 1 composed of a bolt penetrating through the construction member 2. It is also possible to have a construction with the male screw member 11 being composed of a screw rod that penetrates through the construction member 2 and the member 3 to be tightened, and with nut members 12 screwed together at both ends of the screw rod with a pair of washers 4 (4a, 4b) interposing between them, as shown in FIG. 6. Thus, it is possible to implement various combinations of these elements.

Figure 7:
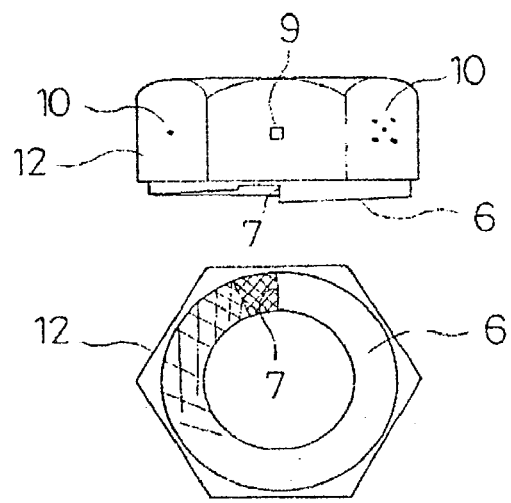
FIG. 7 has a front view and a bottom view of a nut in a third embodiment of the screw mechanism according to the present invention.

A third embodiment of the present invention is described in the following, with reference to FIG. 7. In the above-mentioned embodiment, an example with the pair of washers 4 (4a, 4b) interposing between the nut member 12 and the member 3 to be tightened was shown. However, it is also possible to constitute it so that the upper washer 4 (4a) is integrated with the nut member 12, and has an inclined surface 6 and a tier face 7 formed on the edge face on the member to be tightened side of the nut member 12, thereby a similar action and effect is performed with this constitution. This is not limited to the application to the nut member 12, and can also be applied to the head portion 1a of the male screw member 1 of the above-mentioned first embodiment.

Figure 8:
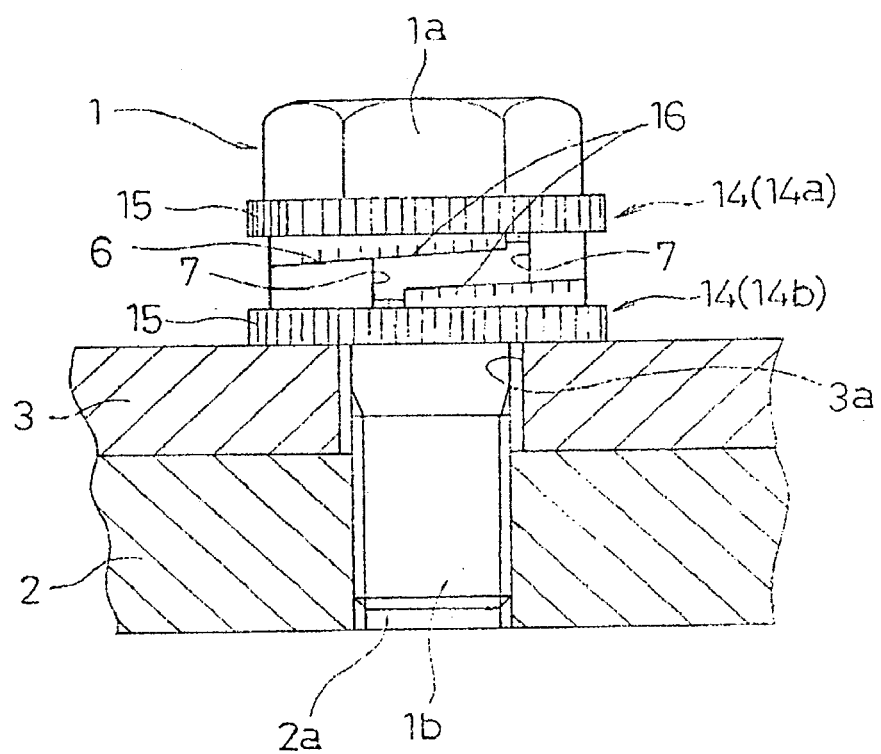
FIG. 8 is a partial sectional front view of an initially tightened state, in a fourth embodiment of the screw mechanism according to the present invention.

A fourth embodiment of the present invention is described in the following, with reference to FIG. 8. In the above-mentioned embodiment, an example was shown with the washer 4 being formed to a deformed-member-form the same form as the head portion 1a of the male screw member 1. In other words, the seat portion 5 was formed in a polygon form. In this embodiment, the washer 14 is provided with a seat portion 15 of disc form with non-slip-means such as knurls formed on the circumference, and made so that the interval between the tier faces 7, 7 can be made a random angle, without being restricted by the polygon shape. A graduation 16 is also formed on the outer circumference along one direction of the inclined direction, starting from the formed position of the tier face 7. This enables an easy perception of the interval size when configuring the interval between the tier faces 7, 7, and makes it possible to configure the desired tightening force.

It is preferred that this pair of washers 14 (14a, 14b) is provided in a pre-fixed state, in which the inclined surfaces 6, 6 are brought into contact with each other, and a pre-scribed interval is provided between the tier faces 7, 7, by the following means or the like. One means has adhesive tapes pasted on the whole circumference of both of the washers 14a and 14b, and another means has the outer circumference edge of the opposing inclined surfaces 6, 6 adhered and fixed by an adhesive. Furthermore, the tightening axial force achieved when tightened until the tier faces 7 are brought into contact is described on the outside face of the adhesive tape pasted on the outer circumference of these washers 14a and 14b, and grease is applied between the inclined surfaces 6, 6 of these washers 14a and 14b.

In this state, initial-tightening is done by handling the pair of washers 14a and 14b as a single unit, and placing them between the head portion 1a of the male screw member 1 and the member 3 to be tightened, and tightening the male screw member 1 lightly. Then a spanner or the like is mated together to the head portion 1a of the male screw member 1 and rotated strongly, making the pre-fixing means break away, and then the male screw member 1 and the upper washer 14a integrally rotate. When they are rotated until the tier faces 7, 7 are brought into contact with each other, the tightening force is controlled to a prescribed value, surely with precision. Since the tightening force is displayed on the outside, it is possible to select a washer suited for the desired tightening force easily and without error, and the operability is good. Furthermore, when grease is applied between the inclined surfaces 6, 6, the frictional resistance is decreased, and it is possible to control the tightening force with even more reliability.

Figure 9:
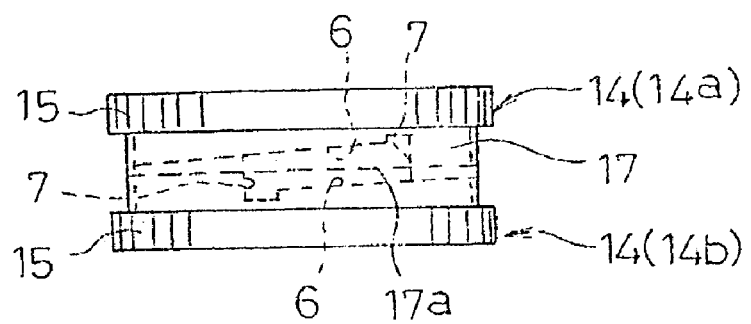
FIG. 9 is a front view showing a supplied-form of a pair of washers, in a fifth embodiment of the screw mechanism according to the present invention.

A fifth embodiment of the present invention is described in the following, with reference to FIG. 9. In this embodiment, an adhesive tape 17 is pasted on the whole circumference of both of the washers 14a and 14b, as explained in the above-mentioned fourth embodiment. There are also tear-off-cuts 17a provided intermittently in the circumference direction of the adhesive tape 17, near the contact face of both of the washers 14a and 14b.

In this state, both of the washers 14a and 14b are pre-fixed surely by the adhesive tape during the initial-tightening. When the male screw member 1 on the tightening side is further tightened and rotated, the adhesive tape 17 is cut off and separated at the tear-off-cut 17a portion, and the adhesive tape 17 is not left in an unsightly state of being torn-off. By setting the strength of the adhesive tape 17 or the interval between the tear-off-cuts 17a to an appropriate value, an appropriate initial-tightening is done and then automatically shifted to a tightening-action, simply by interposing this pair of washers 14a and 14b and conducting the tightening operation with effective workability.

Figure 10:
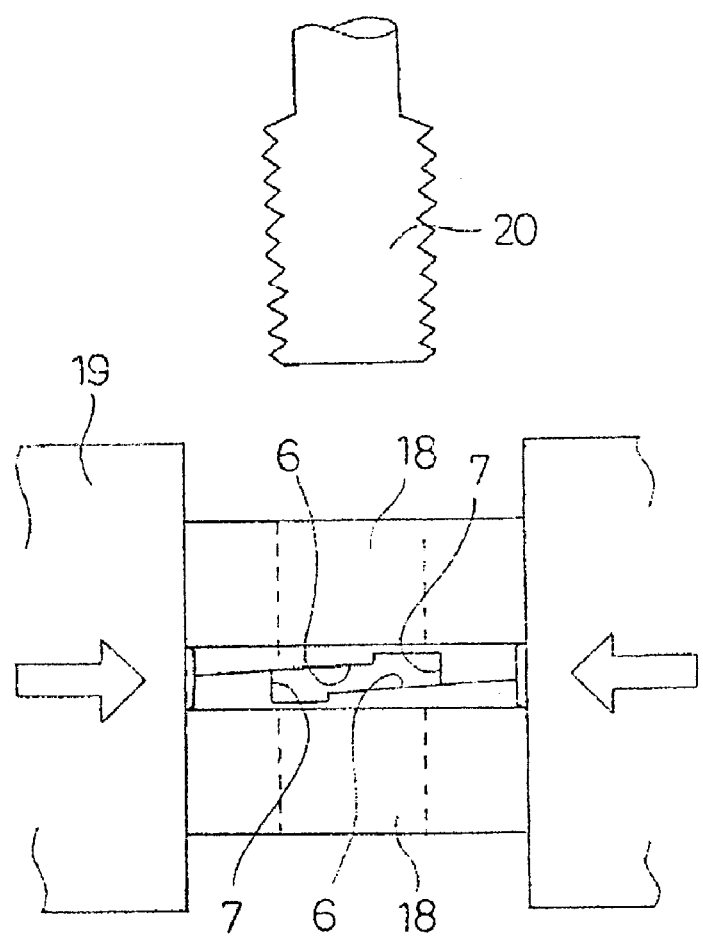
FIG. 10 is a front view showing a manufacturing process of a double nut, in a sixth embodiment of the screw mechanism according to the present invention.

A sixth embodiment of the present invention applied to a double nut is described in the following, with reference to FIG. 10. The double nut of this embodiment is constituted in the following manner. An inclined surface 6 is formed on a mutually pressure-contacting surface of a pair of nut members 18 that only have preparation-holes processed prior to the threading of the female screw. This inclined surface 6 circles around once in spiral form with a lead smaller than the lead of the screw, and both ends are connected with a tier face 7 in the axial direction, similar to the above-mentioned embodiment. Both of the nut members 18, 18 are fixed firmly by a clamp 19, with the inclined surfaces 6 brought into contact with each other, and an interval in the rotating direction provided between the tier faces 7, 7. In this state, a female screw is processed using a tap 20.

With this type of double nut, similar to the above-mentioned embodiment, a prescribed axial force can be loaded between both of the nut members 18, 18 more surely with a small rotating torque, and a robust whirl-stop effect is exerted, by screwing and tightening both of the nut members 18 to the male screw member, then further tightening the upper nut member 18 until the tier faces 7, 7 come into contact with each other.

A seventh embodiment of the present invention applied to a screw mechanism aimed at preventing loosening is described in the following, with reference to FIG. 11 and FIG. 12.

Figure 11:
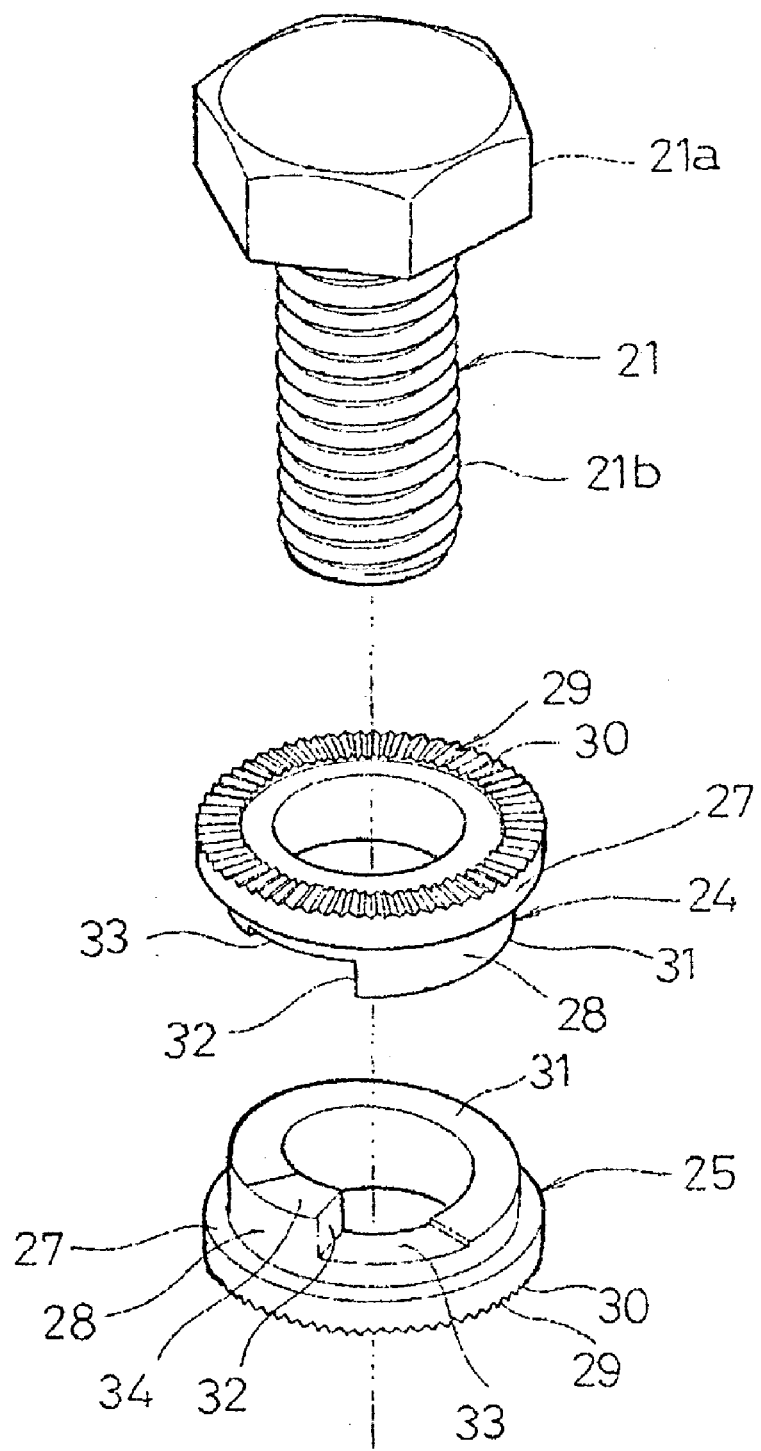
FIG. 11 is a perspective view of a male screw member and upper and lower washers used in a seventh embodiment of the screw mechanism according to the present invention.
Figure 12:
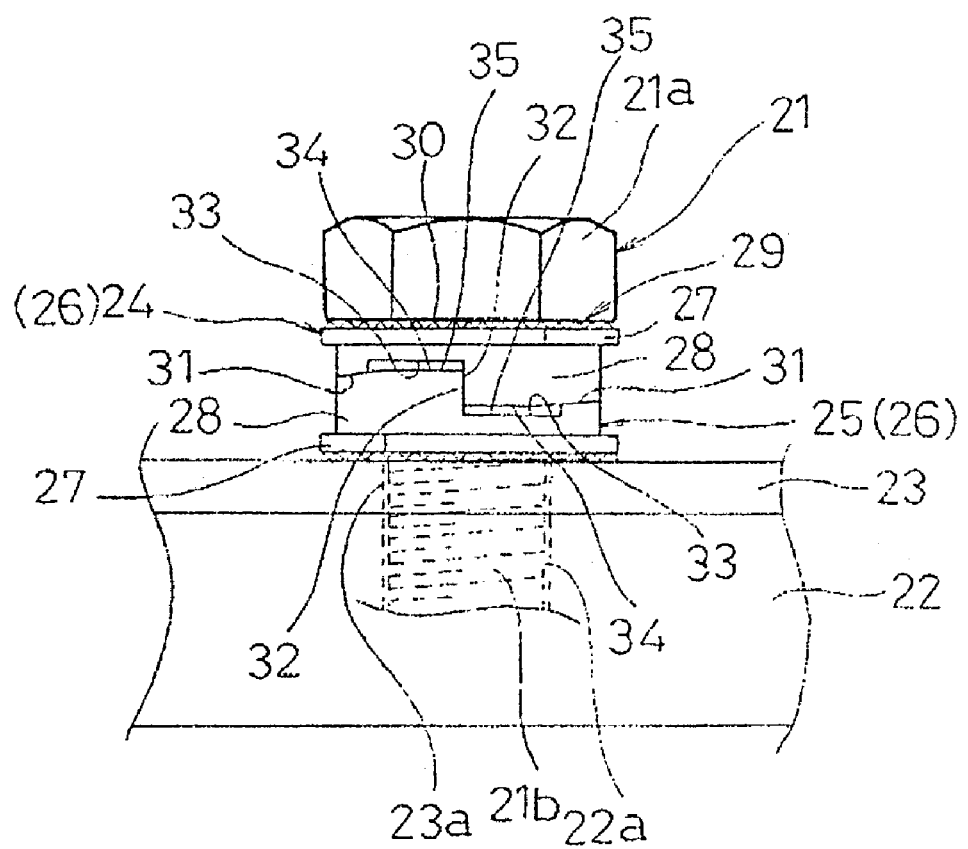
FIG. 12 is a front view of a tightened and fixed state in the same embodiment.

In FIG. 11 and FIG. 12, reference numeral 21 denotes a male screw member composed of a bolt, and reference numeral 22 denotes a female screw member composed of a construction member that has a female screw 22a formed in it. In this embodiment indicated is a case in which a member 23 to be tightened is placed on top of this construction member, and tightened and fixed to the construction member (female screw member) 22, by making the male screw member 21 penetrate through a bolt hole 23a formed on the member 23 to be tightened.

The male screw member 21 has a hexagonal head portion 21a and a male screw 21b, and an upper washer 24 and lower washer 25 are interposed between this head portion 21a and the member 23 to be tightened in a state of being fitted to the outer circumference of the male screw 21a. This upper washer 24 and the lower washer 25 are washers 26 of the same construction interposed in a vertically opposite direction.

The washer 26 is constituted by forming a cylinder portion 8 on top of a seat portion 27, and multitudes of saw-tooth streaks 30 are formed radially on the underside face of the seat portion 27 as non-slip-means 29. An inclined surface 31 is formed on the top end face of the cylinder portion 28, and the inclined surface 31 spirals one turn and heightens upward while going counterclockwise, and both ends of the inclined surfaces 31 are connected with a tier face 7 in the axial direction. The lead of the spiral of the inclined surface 31 is configured to be bigger than the lead of the male screw 21b or the female screw 22a.

Recess-concave-portions 33 and 34 are formed on both end portions of the inclined surface 31, adjacent to the tier face 32. The recess-concave-portion 33 in the end portion nearer to the seat portion 27 is formed by incising and cutting off the end portion of the inclined surface 31 in planar sector form. The recess-concave-portion 34 on the end portion in the upper end side of the cylinder portion 28 is formed by incising and cutting off the end portion of the inclined surface 31 in planar sector form, and in roughly horizontal form.

The upper washer 24 is arranged and installed with the seat portion 27 of the washer 26 facing up, and the non-slip-means 29 comes in contact with the underside of the head portion 21a of the male screw member 21, and is integrated with the head portion 21a in the rotating direction when being tightened together and fixed. The lower washer 25 is arranged and installed with the seat portion 27 of the washer 26 facing down, and the non-slip means 29 comes in contact with the upper surface of the member 23 to be tightened, and is integrated with the member 23 to be tightened and the female screw member 22 in the rotating direction when being tightened together and fixed.

In the above constitution, when tightening and fixing the member 23 to be tightened to the construction member (female screw member) 22, the male screw member 21 is inserted through the upper washer 24 and the lower washer 25, as shown in FIG. 11, and the male screw 21b is allowed to penetrate through the member 23 to be tightened and screwed together with the female screw 22a of the female screw member 22, thereby tightened together firmly. Then, the upper and lower washers 24 and 25 and the member 23 to be tightened are sandwiched and pressed between the head portion 21a of the male screw member 21 and the female screw member 22, accompanying the screwing in of the male screw member 21. In the final stage, the saw-tooth streak 30, which is the non-slip means 29 of upper washer 24, digs into the underside of the head portion 21a of the male screw member 21, and the male screw member 21 and the upper washer 24 integrally rotate. The lower washer 25 also rotates through the mating of the tier faces 32, 32, and is pressed firmly by the lead of the screw to the member 23 to be tightened in the axial direction. Then the saw-tooth streak 30, which is the non-slip means 29, digs into the member 23 to be tightened, and the lower washer 25 and the member 23 to be tightened are integrally coupled in the rotating direction (particularly in the loosening rotation direction). In this state, the member 23 to be tightened is tightened and fixed to the female screw member 22 by the male screw member 21, through the interposition of the upper and lower washers 24 and 25.

When the male screw member 21 and the female screw member 22 try to rotate in a relatively loosening direction in this state, the male screw member 21 is moved in the axial direction by the mating of the inclined surfaces 31, 31 of both of the washers 24 and 25, since the female screw member 22 is integrated in the rotating direction with the inclined surface 31 of the lower washer 25 through the interposition of the member 23 to be tightened, and since the male screw member 21 is integrated in the rotating direction with the inclined surface 31 of the upper washer 24. A large tensile force in the axial direction is acted on the male screw member 21, because the lead of the inclined surface 31 is bigger than the screw lead of both of the screw members 21 and 22. Then the friction force in the screw portion increases, preventing the relative rotation of the male screw member 21 and the female screw member 22 in a loosening direction.

Since recess-concave-portions 33 and 34 are provided in the end portions adjacent to the tier face 32 of the inclined surface 31, which are difficult places to process, it is possible to process with precision at relatively low cost. The contacting area also decreases making the friction resistance between the inclined surfaces 31 smaller. Thus, it is possible to perform a positive non-loosening-action at a practical cost.

By providing the recess-concave-portions 33 and 34, a clearance 35 is generated between both of the inclined surfaces 31, 31 for a prescribed range in the circumference direction, as shown in FIG. 12. Due to this recess, a bending effect to the clearance 35 side of the diameter direction is acted on the male screw member 21, when a reverse-lock is conducted, which generates a non-loosening-load on the male screw member 21 by actively rotating the male screw member 21 in the loosening direction. The rotation of the male screw member 21 is prevented even more firmly, because one end side and the other end side of the male screw 21b of the male screw member 21 in the diameter direction is pressed firmly in the opposite direction, due to this bending. Thus the reverse-lock effect is ensured, and an even bigger non-loosening-effect is achieved.

In the illustrated example, an example of a case in which the upper washer 24, which is integrated in the rotating direction to the head portion 21a of the male screw member 21, was a separate member from the head portion 21a of the male screw member 21. However, it is possible to integrally form the inclined surface 31, the tier face 32, and the recess-concave-portions 33 and 34 with the underside of the head portion 21a. In that case, only a single washer 26 is interposed between the male screw member 21 and the mounting member 23.

Figure 13:
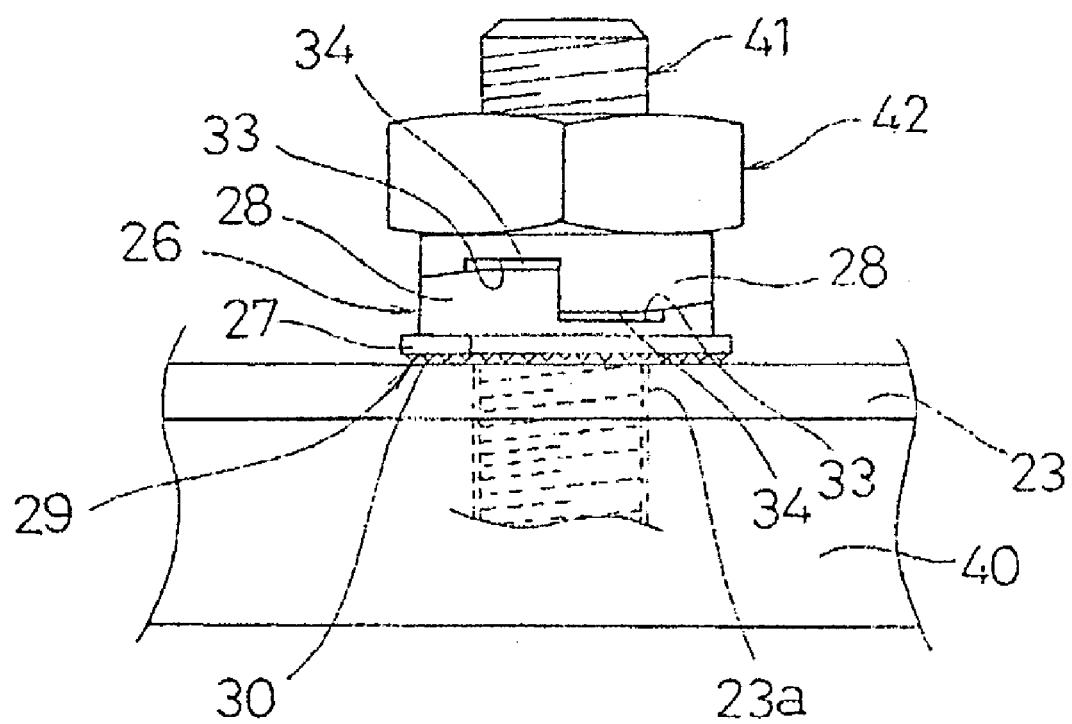
FIG. 13 is a front view of a tightened and fixed state, in an eighth embodiment of the screw mechanism according to the present invention.

An eighth embodiment of the present invention is described in the following, with reference to FIG. 13. In the above-mentioned embodiment, an example was indicated that used the male screw member 21 having the head portion 21a, and the female screw 22a was formed in the construction member to compose the female screw member 22. However in this embodiment, a male screw member 41 is embedded and fixed to a construction member 40, and a member 23 to be tightened is arranged on top of the construction member 40, by making the male screw member 41 be inserted through a bolt hole 23a formed on the member 23 to be tightened, and tightened and fixed with a nut member 42 acting as a female screw member. Furthermore, in this embodiment, a cylinder portion 28 is integrally formed on the underside of a nut member 42, and a single washer 26 is interposed between this nut member 42 and the member 23 to be tightened, and the same action and effect with the above-mentioned embodiment are performed.

In this embodiment, an example with the cylinder portion 28 integrally formed with the nut member 42 was shown, however it is possible to use an ordinary nut for the nut member 42, as in the above-mentioned embodiment, and have a pair of washers 26 interposed between this nut and the member 23 to be tightened.

In this embodiment, an example was shown of a case in which the male screw member 41 was fixed to the construction member 40. However it is possible to have a construction with the lower portion of the construction member 40 to be similar in construction to those in FIG. 12 of the above-mentioned embodiment, and have the male screw member 41 constituted by a male screw member 21 composed of a bolt, and have a pair of washers 26 interposed between the head portion 21a and the construction member 40. It is also possible to have a construction with the male screw member 41 composed of a screw rod that penetrates through the construction member 40 and the member 23 to be tightened, and have nut members 42 screwing-together at both ends of the screw rod with an interposing washer 26 placed in-between, as shown in FIG. 13. It is possible to implement various combinations of these elements.

Figure 14:
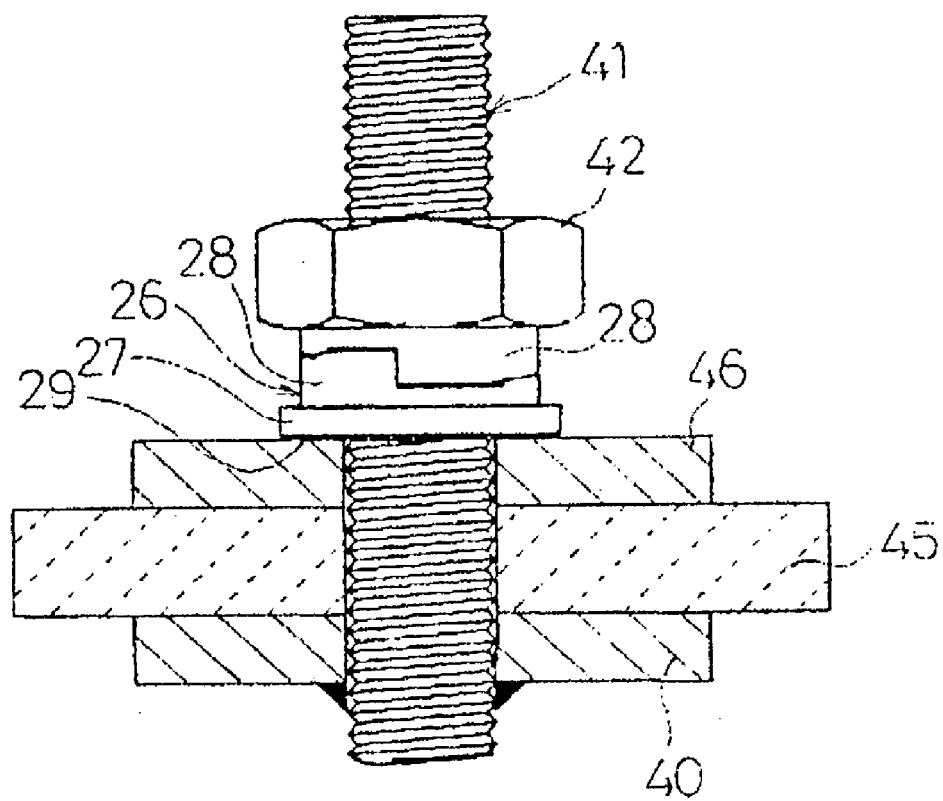
FIG. 14 is a front view of a tightened-together-and-fixed state, in a ninth embodiment of the screw mechanism according to the present invention.

A ninth embodiment of the present invention is described in the following, with reference to FIG. 14. In this embodiment, it is constituted so that a member 45 to be tightened with low anti-crack characteristics, such as glass or ceramics, is placed on top of a construction member 40, which has a male screw member 41 provided in a standing state by welding and fixing one end thereof. It is also constituted so that it is tightened and fixed with a nut member 42 that has a cylinder portion 28 integrally formed on the underside portion of it, with a stiffening plate 46 composed of metal and a single washer 26 interposed in-between.

In this embodiment, when tightening the nut member 42, the burden of the rotating torque is shared by the friction force between the non-slip-means 29 of the washer 26 and the stiffening-plate 46. When the tightening force becomes stronger than a prescribed value, the sharing of the burden becomes close to 100%, because the non-slip-means 29 and the stiffening-plate 46 become integrated more completely. Hence the tightening force on the member 45 to be tightened is limited to a prescribed value and does not exceed that value, even when the tightening rotational torque gets stronger than a prescribed value. Therefore, a member 45 to be tightened with low anti-crack characteristics is tightened and fixed safely, while surely preventing the loosening, as explained above.

Figure 15:
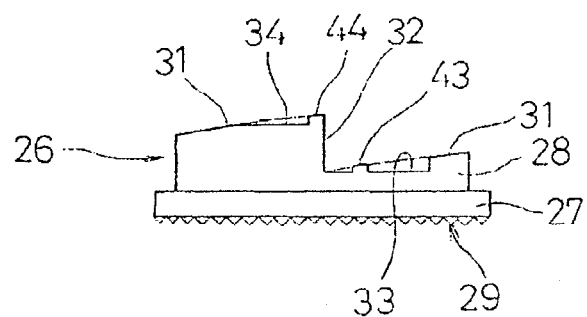
FIG. 15 is a front view of a washer, in a tenth embodiment of the screw mechanism according to the present invention.

A tenth embodiment of the present invention is described in the following, with reference to FIG. 15, FIG. 16A, and FIG. 16B. In the above-mentioned embodiment, the recess-concave-portions 33 and 34 were simply formed on the inclined surface 31 of the washer 26. In this embodiment, stoppers 43 and 44 are installed in protrusion on each of the recess-concave-portions 33 and 34 of the inclined surface 31 of the washer 26, to maintain a reverse-lock state by mutually coming in contact with each other, where this reverse lock locks by rotating in the opposite direction of the tightening-direction after tightening and fixing the male screw member 21 and the female screw member 22, as mentioned above. The stopper 43 is installed in protrusion at a position with an appropriate distance from the end of the recess-concave-portion 33, the distance corresponding to the rotating amount of the reverse-lock, and installed so that its height does not protrude above the extended line of the inclined surface 31. The stopper 44 is installed in protrusion at the end of the recess-concave-portion 34, so that its height does not protrude above the extended line of the inclined surface 31.

Figure 16A:
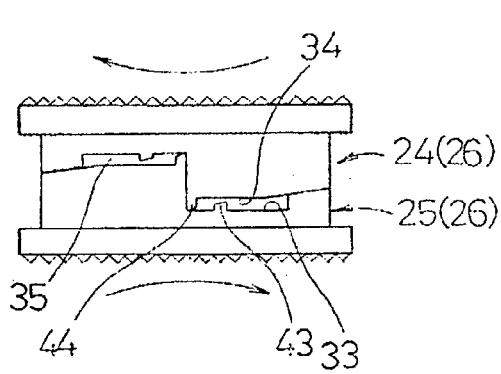
FIG. 16A is an explanatory drawing of an action in a tightening of the same embodiment.
Figure 16B:
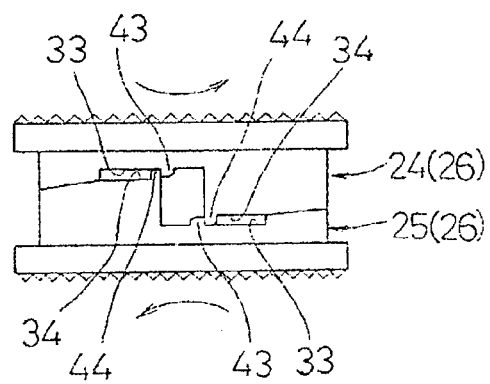
FIG. 16B is an explanatory drawing of an action in a reverse-lock of the same embodiment.

In this embodiment, when the male screw member 21 is screwed in, the upper washer 24 integrally rotates with the male screw member 1, and the lower washer 25 and the member 23 to be tightened are integrally coupled in the rotating direction, while rotating the lower washer 25 relative to the member 23 to be tightened through the mating of the tier faces 32, as shown in FIG. 16A. In this case, the stoppers 43 and 44 do not obstruct the above-mentioned action, since they do not protrude above the inclined surface 31. After tightening and fixing the male screw member 21 and female screw member 22 in this way, a reverse-lock is conducted by rotating the male screw member 21 and the upper washer 24 in the opposite direction of the tightening direction and locking, as shown in FIG. 16B. In this state, one end and the other end of the male screw 21b of the male screw member 21 in the diameter direction are pressed firmly in the opposite direction, because the male screw member 21 and the upper washer 24 are inclined in the diameter direction to the clearance 35 side due to the clearance 35 formed in the recess-concave-portions 33 and 34. This prevents the rotation of the male screw member 21 even more, and the reverse-lock effect is ensured, and an even bigger non-slip-effect is achieved. Moreover, the stoppers 43 and 44 are mated together in the rotating direction, and prevent the male screw member 21 and the upper washer 24 from rotating in the tightening direction. The non-loosening-effect is maintained even more surely, because the stoppers 43 and 44 maintain the reverse-lock state surely.

Needless to say in detail, these stoppers 43, 44 can be applied to the above-mentioned various embodiments.

It is also possible to constitute each of the above-mentioned embodiments, so that the washer 26 is composed of a material of spring characteristics, and make it a spring washer by cutting and separating at the tier face 32 portion, and deforming both ends apart in the axial direction, relative to each other.

An eleventh embodiment of the present invention is described in the following, with reference to FIG. 11 and FIG. 12 of the above-mentioned seventh embodiment, and FIG. 17 to FIG. 19B. It should be noted that, descriptions are quoted from the seventh embodiment for elements that are common with the seventh embodiment, and mainly only the differences are described here.

Figure 17:
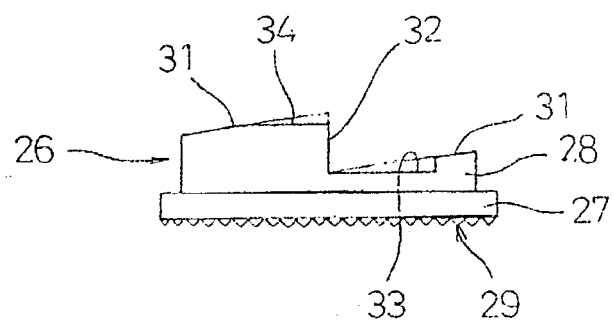
FIG. 17 is a front view of a washer, in an eleventh embodiment of the screw mechanism according to the present invention.

In this embodiment, the washer 26 shown in FIG. 17 is constituted by a material higher in hardness than the male screw member 21 and the member 23 to be tightened, and the member 23 to be tightened is constituted by a material lower in hardness than the male screw member 21. For example, the washer 26 and the male screw member 21 are composed of hardened steel material, and the quenching-hardness of the washer 26 is configured to be high, and the member 23 to be tightened is composed of steel material for machine-structure or general-structure. The lead angle of the spiral of the inclined surface 31 of the washer 26 is configured to be 1.5 times the lead angle of the screw or more, and also two times the lead angle of the screw or less.

The upper washer 24 is arranged and installed with the seat portion 27 of the washer 26 facing up, and the non-slip-means 29 comes in contact with the underside of the head portion 21a of the male screw member 21, and is integrated with the head portion 21a in the rotating direction with the friction force, before and after the completion of the tightening. The lower washer 25 is arranged and installed with the seat portion 27 of the washer 26 facing down, and the non-slip-means 29 comes in contact with the upper side of the member 23 to be tightened, and is integrated with the member 23 to be tightened and the female screw member 22 in the rotating direction with the friction force, before and after the completion of the tightening. In this case, the dig-in-degree of the non-slip-means 29 of the lower washer 25 to the member 23 to be tightened becomes stronger than the dig-in-degree of the non-slip-means 29 of the upper washer 24 to the head portion 21a of the male screw member 21. Thus the friction force between the head portion 21a of the male screw member 21 and the upper washer 24 becomes smaller than the friction force between the member 23 to be tightened and the lower washer 25.

In the above constitution, when tightening and fixing the member 23 to be tightened to the female screw member (construction member) 22, the male screw member 21 is inserted through the upper washer 24 and the lower washer 25, as shown in FIG. 11, and the male screw 21b is allowed to penetrate through the member 23 to be tightened and is screwed together with the female screw 22a of the female screw member 22, and tightens and rotates the male screw member 21. Halfway through the screwing in of the male screw member 21, the upper and lower washers 24 and 25 and the member 23 to be tightened are sandwiched and pressed between the head portion 21a of the male screw member 21 and the female screw member 22. Then the saw-tooth streak 30, which is the non-slip means 29 of the upper washer 24, digs into the underside of the head portion 21a of the male screw member 21, and the male screw member 21 and the upper washer 24 integrally rotate. Then the lower washer 25 also rotates through the mating-together of the tier faces 32, and the tightening of the male screw member 21 advances with the lead of the screw.

Just before the completion of the tightening, the lower washer 25 is pressed firmly to the member 23 to be tightened in the axial direction. Then the saw-tooth streak 30, which is the non-slip means 29, digs into the member 23 to be tightened and generates a big friction force, and stops the rotation, and the upper washer 24 also corresponds and stops the rotation. By configuring the friction force between the head portion 21a of the male screw member 21 and the upper washer 24 to be smaller than the friction force between the support member 23 and the lower washer 25, preferably as small as possible within the range of being surely bigger than the friction force between the inclined surfaces 31, 31 such as in a range of two to four times for example, it is possible to tighten while generating a slip between the upper washer 24, when tightening and rotating the male screw member 21 even more. As a result, when the tightening is completed, the member 23 to be tightened is tightened and fixed to the female screw member 22 by the male screw member 21 with sufficient tightening force, through the interposition of the upper and lower washers 24 and 25. The lower washer 25 is pressed even harder to the member 23 to be tightened with this tightening force, and put to a state of being integrated in the rotating direction with an even stronger friction force.

When the male screw member 21 and the female screw member 22 try to rotate in a relatively loosening direction in this state, the female screw member 22 is integrated in the rotating direction with the lower washer 25 through the interposition of the member 23 to be tightened, and the male screw member 21 is integrated in the rotating direction with the upper washer 24, by a friction force bigger than the friction force between the inclined surfaces 31, 31 of the upper and lower washers 24 and 25. Hence, a slip is generated between the inclined surfaces 31, 31 of both of the washers 24 and 25, and the male screw member 21 is moved in the axial direction by the mating of these inclined surfaces 31, 31. Thus a big tensile force in the axial direction is acted on the male screw member 21, because the lead of the inclined surface 31 is bigger than the lead of the screws of both of the screw members 21 and 22, and the friction force in the screw portion increases, preventing the relative rotation of the male screw member 21 and the female screw member 22 in the loosening direction.

In case of canceling the tightening, it is easy to cancel with about the same torque as in tightening, by rotating the male screw member 21 in the opposite direction while holding the rotation of the upper washer 24. Therefore, it is preferred that a different-diameter-parallel-face (not shown) is formed on the outer circumference of the upper washer 24, which mates together with a spanner or the like.

In this embodiment, the following effects are achieved, since the lead angle of the spiral of the inclined surface 31 is configured to be 1.5 to two times the lead angle of the screw. When conducting a reverse-lock, which locks by rotating in the opposite direction of the tightening direction after tightening the male screw member 21, it is possible to achieve a tightening force equal to the value achieved when tightened by a screw having a lead angle equal to the difference between the spiral lead angle of the inclined surface 31 and the lead angle of the screw. Hence, two to one times the tightening force is achieved when conducting a reverse-lock, compared to the tightening force in normal tightening using the same rotating torque. Furthermore, a non-loosening-effect is also maintained, because the lead was made to be 1.5 times or more.

Figure 18A:
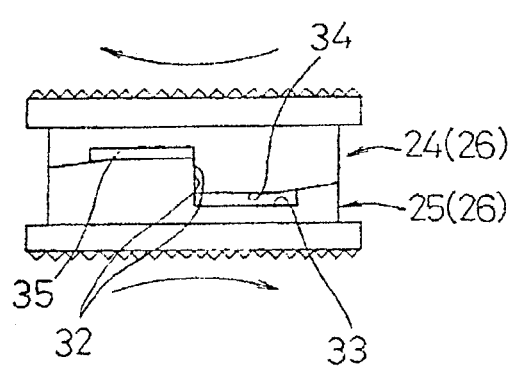
FIG. 18A is an explanatory drawing of an action in a tightening of the same embodiment.
Figure 18B:
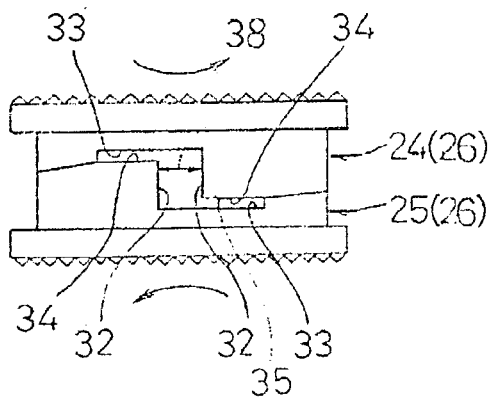
FIG. 18B is an explanatory drawing of an action in a reverse-lock of the same embodiment.
Figure 19A:
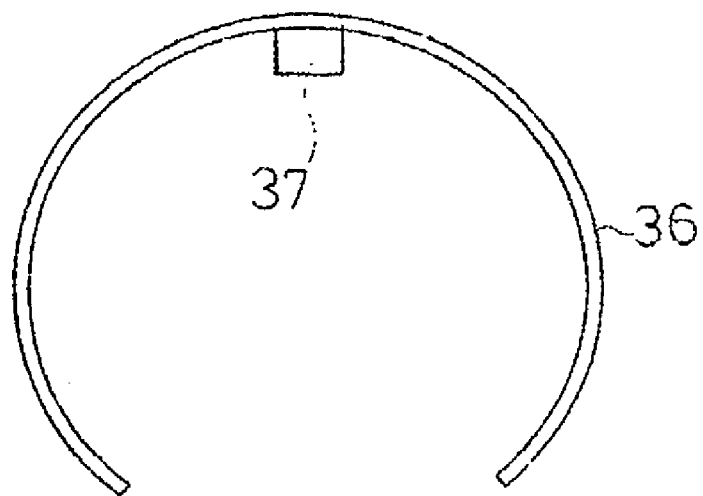
FIG. 19A is a plan view of a latching-ring that maintains the reverse-lock state.
Figure 19B:
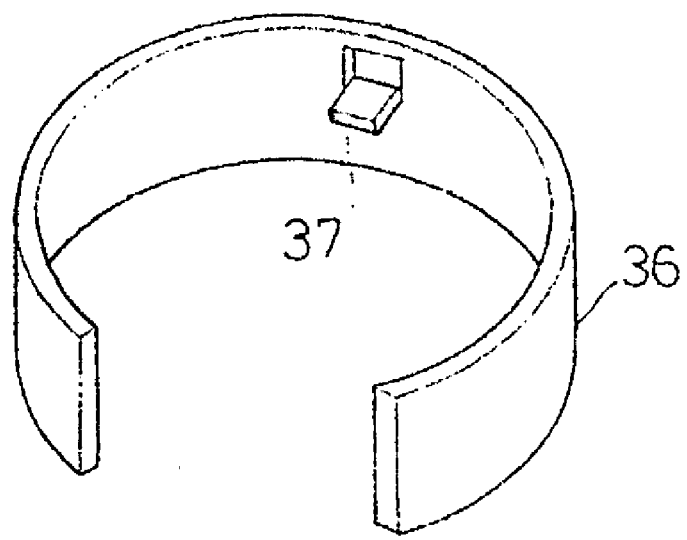
FIG. 19B is a perspective view of aforementioned latching-ring, in the same embodiment.

In this embodiment, a latching-ring 36 is provided, as shown in FIG. 19A and FIG. 19B, to maintain the reverse-lock state. This reverse-lock state is conducted by rotating in the opposite direction of the tightening direction and locking, as shown in FIG. 18B, after the male screw member 21 and the female screw member 23 have been tightened and fixed, as shown in FIG. 18A. This latching-ring 36 has a planar and C-lettered form, and can be fit onto the outer circumference of the upper and lower washers 24 and 25 elastically. A tongue piece 37 is installed in protrusion in the inner circumference of the latching-ring 36, which fits into the clearance 38 generated between the tier faces 32, 32 of the upper and lower washers 24 and 25, in the above-mentioned reverse-lock state.

By making the latching-ring 36 fit onto the outer circumference of the upper and lower washers 24 and 25, the reverse-lock state is maintained surely by the tongue piece 37. This prevents the occurrence of a situation in which the male screw member 21 and the upper washer 24 rotate along the inclination of the cam face 31 due to a vibration or the like, and the reverse-lock is canceled unexpectedly, and the non-loosening-effect is decreased.

Figure 20:
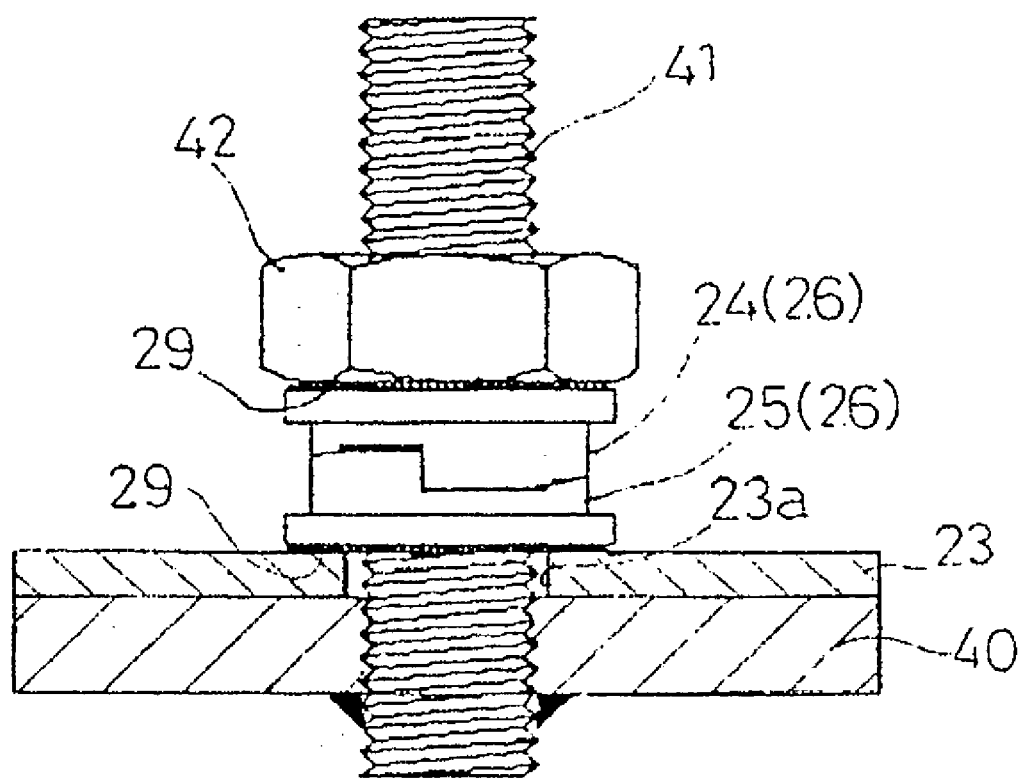
FIG. 20 is a front view of a tightened and fixed state, in a twelfth embodiment of the screw mechanism according to the present invention.

A twelfth embodiment of the present invention is described in the following, with reference to FIG. 20. In the above-mentioned embodiment, an example was indicated that used the male screw member 21 having the head portion 12a, and the female screw 22a was formed in the construction member to compose the female screw member 22. However, in this embodiment, it is constituted so that a male screw member 41 is embedded and fixed into a construction member 40, and a member 23 to be tightened is arranged on top of the construction member 40, by making the male screw member 41 be inserted through a bolt hole 23a formed on the member 23 to be tightened, and tightened and fixed with a nut member 42 acting as a female screw member. In this case, the same action and effect with the above-mentioned embodiment is also performed, by making the upper washer 24 and the lower washer 25 be interposed between the nut member 42 and the member 23 to be tightened.

In this embodiment, an example of a case in which the male screw member 41 is fixed to the construction member 40 was shown. However, it is possible to have the lower portion of the construction member 40 to be similar in construction to those in FIG. 12, and have a male screw member 21 constituted by a male screw member 1 composed of a bolt. It is also possible to have a male screw member 21 composed of a screw rod that penetrates through the construction member 40 and the mounting member 23, and have a construction with nut members 42 screwing at both ends of the screw rod with upper and lower washers 24 and 25 interposing in-between, as shown in FIG. 20. It is possible to implement various combinations of these elements.

Figure 21A:
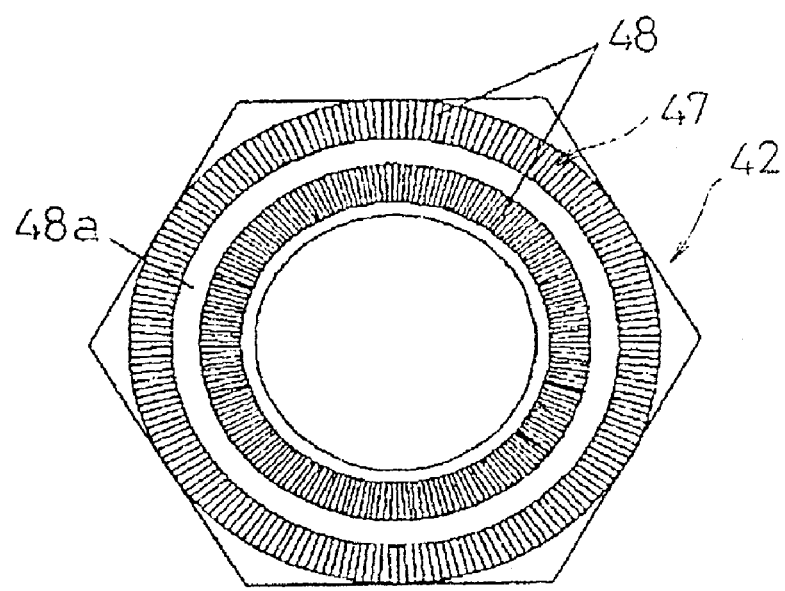
FIG. 21A is a bottom view of a non-slip-protrusion-group formed on a screw member on the tightening side.
Figure 21B:
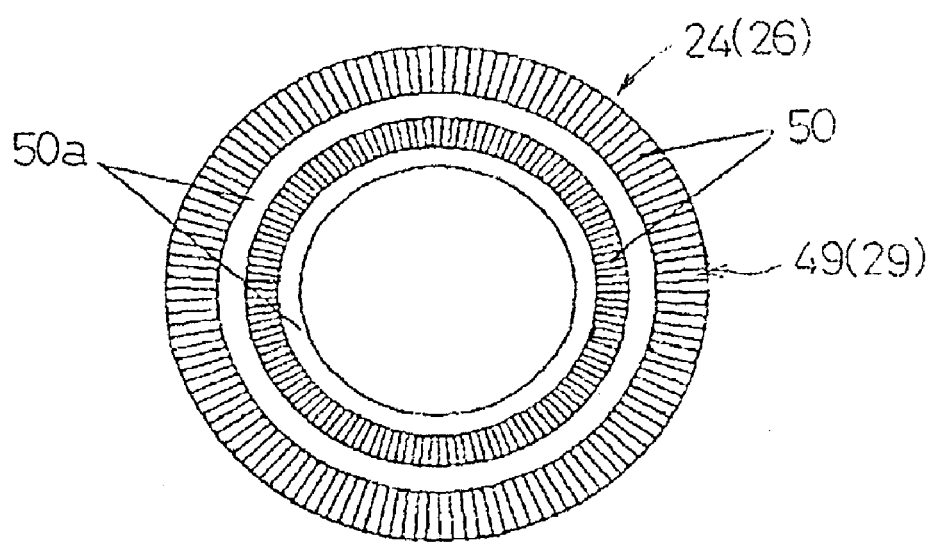
FIG. 21B is a plan view of a non-slip-protrusion-group formed on an upper washer, in a thirteenth embodiment of the screw mechanism according to the present invention.
Figure 22:
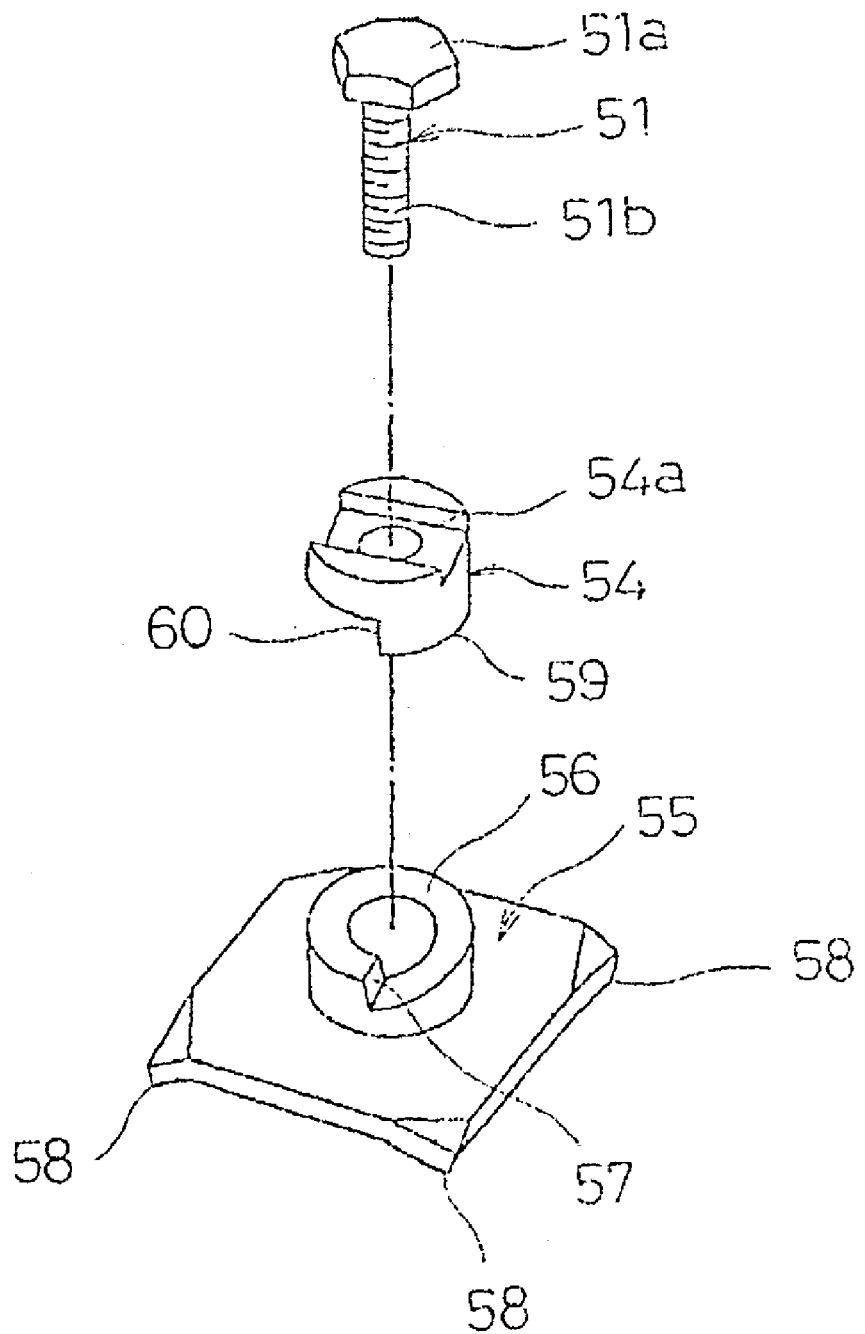
FIG. 22 is an exploded perspective view of a loosening preventing apparatus in a screw mechanism of a conventional example.

A thirteenth embodiment of the present invention is described in the following, with reference to FIG. 21A and FIG. 21B. In the above-mentioned embodiment, an example was shown with the hardness of the nut member 42 made harder than the hardness of the member 23 to be tightened, and the friction force between the upper washer 24 and the nut member 42 made smaller than the friction force between the lower washer 25 and the member 23 to be tightened. However in this embodiment, the non-slip-means 29 formed on the upper and lower washers 24 and 25 are constituted by non-slip-protrusion-groups 49, and a non-slip-protrusion-group 47 of a different protrusion-arrange-install-pitch with the non-slip-protrusion-group 49 is formed on the underside of the nut member 42, which is the screw member on the tightening side. Furthermore, in this embodiment, the non-slip-protrusion-group 47 is constituted by plural streaks of non-slip-protrusion-bands 48 (refer to FIG. 21A) arranged and installed in annular form around the axle center, and with an appropriate interval 48a in the radius direction. The non-slip-protrusion-group 49 is constituted by plural streaks of non-slip-protrusion-bands 50 (refer to FIG. 21B) arranged and installed in annular form around the axle center, and with an appropriate interval 50a in the radius direction.

In this embodiment, the friction force between the male screw member 21 and the upper washer 24 is made smaller, by making non-slip-protrusion-bands 48 and 50 of different pitches contact with each other between the male screw member 21 and the upper washer 24. Hence, the above-mentioned action and effect is achieved surely, without using a material whose hardness is harder than the hardness of the member 23 to be tightened for the nut member 42, such as using a nut member 42 composed of a steel material for machine-structure-use, which is the same material used in the member 23 to be tightened, for example.

And the forming with the knurling process is made easy, and the friction force is controlled easily, because the non-slip-protrusion-group 49 and the non-slip-protrusion-group 47 are constituted by plural streaks of non-slip-protrusion-bands 50 and 48 arranged and installed in annular form around the axle center, and with an appropriate interval 50a and 48a in the radius direction. It is also possible to have a non-slip-protrusion-band in the radius direction arranged and installed with an appropriate interval in the circumference direction, instead of the annular non-slip-protrusion-band 50 and 48. In the drawing example, a nut member 42 was indicated as the screw member on the tightening side, but needless to say, similar action and effect is achieved by the male screw member 21 of the first embodiment, by forming a non-slip-protrusion-group 47 on the underside of the head portion 21a.

In each of the above-mentioned embodiments, when a friction-force-adjusting-sheet composed of a cloth or paper containing abrasive-grains is interposed between the opposing surface of the male screw member 21 or the nut member 42, which are the screw members on the tightening side, and the seating-surface of the upper washer 24, it is possible to achieve a state of the following easily and with precision. The state in which, the friction force between the opposing face of the screw member on the tightening side 21 or 42 and the seating-surface of the upper washer 24, is as small as possible within the range of being bigger than the friction force between the inclined surfaces 31. It is also low in cost, and easy to handle.

Furthermore, it is also possible in this embodiment, to form stoppers 43 and 44 on the recess-concave-portions 33 and 34, similar to the tenth embodiment that was described with reference to FIG. 15, FIG. 16A, and FIG. 16B. In that case, it is possible to perform a sure maintaining of the state of reverse-lock, without using the latching-ring 36.

INDUSTRIAL APPLICABILITY

In the screw mechanism of the present invention, the screw member on the tightening side is made to rotate for a prescribed angle through the interposition of the inclined surface with a spiral lead smaller than the lead of the screw, after the initial-tightening is done and there is no play. This enables an easy, positive, and precise control of the tightening force, using the rotating angle of the screw member on the tightening side. Alternatively, relative rotation of both of the screw members in the loosening direction is prevented, by interposing inclined surfaces between the screw members, and configuring the spiral lead of the inclined surfaces to be bigger than the lead of the screw, and the loosening is prevented surely. Therefore, it is possible to control the tightening force surely and with precision, and also possible to surely prevent the loosening of the screw by vibrations, and useful in achieving a highly reliable tightening state.

What is claimed is:

1. A screw mechanism having a member to be tightened being tightened and fixed by screwing screw member on a tightening side to a second screw member, comprising:
   structures having a pair of inclined surfaces interpose between the screw member on the tightening side and the member to be tightened in a mutually contacted state;
   said inclined surfaces circling around substantially once in spiral form with a lead smaller than a lead of the screw, both ends thereof having a tier face in the axial direction interposed therebetween;
   said inclined surfaces being formed on mutually contacting surfaces of a pair of washers interposed between the screw member on the tightening side and the member to be tightened; and
   a pre-fixing means for pre-fixing both of the pair of washers to break away with a rotating torque of a tightening in a state of making said inclined surfaces of said pair of washers coming into contact with each other, and said pair of tier faces being spaced with a prescribed interval.

2. The screw mechanism according to claim 1, wherein said pre-fixing means is composed of an adhesive tape pasted on the outer circumference of said washers, and an achievable tightening axial force is indicated on an outer face of said pre-fixing means.

3. The screw mechanism according to claim 1, wherein said pre-fixing means is composed of an adhesive tape pasted on the outer circumference of said washers, and a plurality of tear-off-cuts are provided intermittently on a circumference direction on said adhesive tape in a vicinity of a contacting face of both of said washers.

4. The screw mechanism according to any one of the claims 1 to 3, wherein both of said washers are pre-fixed with grease applied between said inclined surfaces.

5. The screw mechanism according to any one of claims 1 through 3, wherein, for each of the inclined surfaces a flat recessed surface is interposed between one end of the spiral form and a second end of the spiral form which is terminated in the tier face.

6. The screw mechanism according to any one of claims 1 through 3, wherein, for each of the inclined surfaces a flat recessed surface is interposed between one end of the spiral form and a second end of the spiral form which is terminated in the tier face.

7. A screw mechanism having a member to be tightened being tightened and fixed by screwing screw member on a tightening side to a second screw member, comprising:

structures having a pair of inclined surfaces interpose between the screw member on the tightening side and the member to be tightened in a mutually contacted state;

said inclined surfaces circling around substantially once in spiral form with a lead smaller than a lead of the screw, both ends thereof having a tier face in the axial direction interposed therebetween;

said inclined surfaces being formed on mutually contacting surfaces of a pair of washers interposed between the screw member on the tightening side and the member to be tightened; and a graduation being formed on the outer circumference of said washer along one direction in the inclination direction from the formed position of said tier face.

8. A screw mechanism having a member to be tightened tightened and fixed by screwing one screw member to an other screw member, wherein said screw mechanism is to be provided between opposing surfaces of a screw member on the tightening side and a member to be tightened, said screw mechanism comprising:

a first washer having an inclined surface circling around substantially once in spiral form, ends of said inclined surface having a tier face in an axial direction interposed therebetween; and a second washer having an inclined surface face-contacting with said inclined surface of said first washer, ends of said inclined surface having a tier face in an axial direction interposed therebetween, wherein spiral leads of said inclined surfaces of both of said washers are configured to be bigger than a screw lead of said screw members, a friction force between the screw member on the tightening side and said first washer is constituted to be bigger than a friction force between said inclined surfaces of both of said washers, and smaller than a friction force between said second washer and the member to be tightened, before and after the completion of the tightening;

a latching-ring having a planar and C-lettered form fittable onto an outer circumference of said first and second washers elastically, a tongue piece installed in protrusion in an inner circumference of said latching-ring 36, fitting into a clearance generated between said tier faces of said first and second washers, in a state of reverse-lock having been conducted, where said reverse-lock locks by rotating in an opposite direction of the tightening direction, after tightening the screw member on the tightening side.

9. The screw mechanism according to claim 8 wherein said inclined surfaces each have having sequentially a first plane surface extending radially, the tier face in an axial direction, and a second plane surface extending radially interposed between the ends thereof.

* * * * *